(12) United States Patent
Mimura et al.

(10) Patent No.: US 9,597,803 B2
(45) Date of Patent: Mar. 21, 2017

(54) ROBOT DEVICE

(71) Applicant: CANON KABUSHIKI KAISHA, Tokyo (JP)

(72) Inventors: Toshihiko Mimura, Tokyo (JP); Takashi Arai, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 13/951,827

(22) Filed: Jul. 26, 2013

(65) Prior Publication Data

US 2014/0046486 A1 Feb. 13, 2014

(30) Foreign Application Priority Data

Aug. 8, 2012 (JP) .................................. 2012-175889

(51) Int. Cl.
*G05B 15/00* (2006.01)
*G05B 19/00* (2006.01)
*B25J 9/16* (2006.01)
*B25J 13/08* (2006.01)

(52) U.S. Cl.
CPC ............. *B25J 9/1697* (2013.01); *B25J 13/08* (2013.01)

(58) Field of Classification Search
CPC ...................................... B25J 9/1697
USPC ........................................... 700/259
See application file for complete search history.

(56) References Cited

U.S. PATENT DOCUMENTS

| | | | | |
|---|---|---|---|---|
| 4,545,723 A | * | 10/1985 | Clark | ....... B25J 15/04 294/86.4 |
| 4,591,198 A | * | 5/1986 | Monforte | ....... 294/207 |
| 4,620,362 A | * | 11/1986 | Reynolds | ......... B25J 15/04 279/900 |
| 4,660,274 A | * | 4/1987 | Goumas | ........ B23Q 3/15506 294/119.1 |
| 4,708,383 A | * | 11/1987 | Deringer | ......... B25J 15/00 294/86.4 |
| 4,715,802 A | | 12/1987 | Arai | |
| 4,767,257 A | * | 8/1988 | Kato | ................ 414/744.5 |

(Continued)

FOREIGN PATENT DOCUMENTS

| | | |
|---|---|---|
| JP | H06-039767 A | 2/1994 |
| JP | H07-178693 A | 7/1995 |

(Continued)

OTHER PUBLICATIONS

Japanese Office Action dated Jun. 21, 2016 in Japanese Patent Application No. 2012175889.

(Continued)

*Primary Examiner* — Harry Oh
(74) *Attorney, Agent, or Firm* — Fitzpatrick, Cella, Harper & Scinto

(57) ABSTRACT

Provided is a small-sized robot device having high versatility without decreasing the work efficiency. The robot device includes: an arm; a hand or a tweezer tool that includes a stereo camera for measuring a three-dimensional position of a workpiece, the hand or the tweezer tool performing a work with respect to the workpiece whose three-dimensional position has been measured by the stereo camera; and a connection portion or a hand provided at a distal end of the arm, the connection portion or the hand releasably connecting the hand or the tweezer tool to the arm.

6 Claims, 16 Drawing Sheets

(56) References Cited

U.S. PATENT DOCUMENTS

| | | | | |
|---|---|---|---|---|
| 5,069,524 | A | * | 12/1991 | Watanabe et al. .............. 385/59 |
| 5,243,264 | A | * | 9/1993 | Takada et al. ........... 318/568.11 |
| 5,360,249 | A | * | 11/1994 | Monforte ............. B25J 15/0475 294/119.1 |
| 5,416,904 | A | | 5/1995 | Arai et al. |
| 5,533,147 | A | | 7/1996 | Arai et al. |
| 5,909,216 | A | | 6/1999 | Matsubayashi et al. |
| 6,287,059 | B1 | * | 9/2001 | Hashidate ............. B23B 31/261 279/155 |
| 6,311,436 | B1 | | 11/2001 | Mimura et al. |
| 8,992,113 | B2 | * | 3/2015 | Campagna ............... B25J 15/04 403/349 |
| 2004/0052630 | A1 | * | 3/2004 | Nihei ..................... B25J 13/085 414/730 |
| 2004/0080294 | A1 | * | 4/2004 | Nihei ..................... B25J 19/023 318/568.16 |
| 2004/0172164 | A1 | * | 9/2004 | Habibi .................. B25J 9/1692 700/245 |
| 2004/0186624 | A1 | * | 9/2004 | Oda et al. ...................... 700/245 |
| 2005/0096792 | A1 | * | 5/2005 | Watanabe ............. B25J 19/023 700/245 |
| 2006/0104788 | A1 | * | 5/2006 | Ban ........................ B25J 9/1697 414/729 |
| 2009/0044655 | A1 | * | 2/2009 | DeLouis et al. ........... 74/490.05 |
| 2010/0298978 | A1 | * | 11/2010 | Tani ....................... B25J 19/023 700/259 |
| 2010/0312393 | A1 | * | 12/2010 | Someya ................. B25J 9/1697 700/259 |
| 2012/0004774 | A1 | * | 1/2012 | Umetsu ................ B25J 15/0009 700/254 |
| 2012/0059517 | A1 | * | 3/2012 | Nomura ................ B25J 9/1612 700/259 |
| 2012/0190981 | A1 | * | 7/2012 | Harris et al. .................. 600/439 |
| 2013/0010081 | A1 | * | 1/2013 | Tenney et al. ................... 348/47 |

FOREIGN PATENT DOCUMENTS

| | | |
|---|---|---|
| JP | H08-001563 A | 1/1996 |
| JP | H08-047881 A | 2/1996 |
| JP | 2002-343480 A | 11/2002 |
| JP | 2003-333738 A | 11/2003 |
| JP | 2008-129696 A | 6/2008 |
| JP | 2010-089222 A | 4/2010 |
| JP | 2011-011315 | 1/2011 |
| JP | 2011-167802 A | 9/2011 |
| JP | 2011-222338 A | 11/2011 |
| JP | 2012-115983 A | 6/2012 |

OTHER PUBLICATIONS

Japanese Office Action dated Jan. 10, 2017 in Japanese Patent Application No. 2012175889.

* cited by examiner

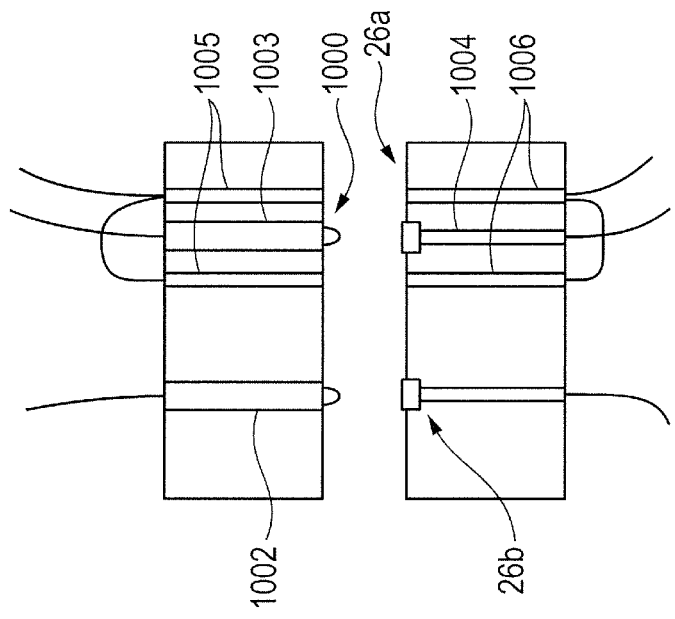
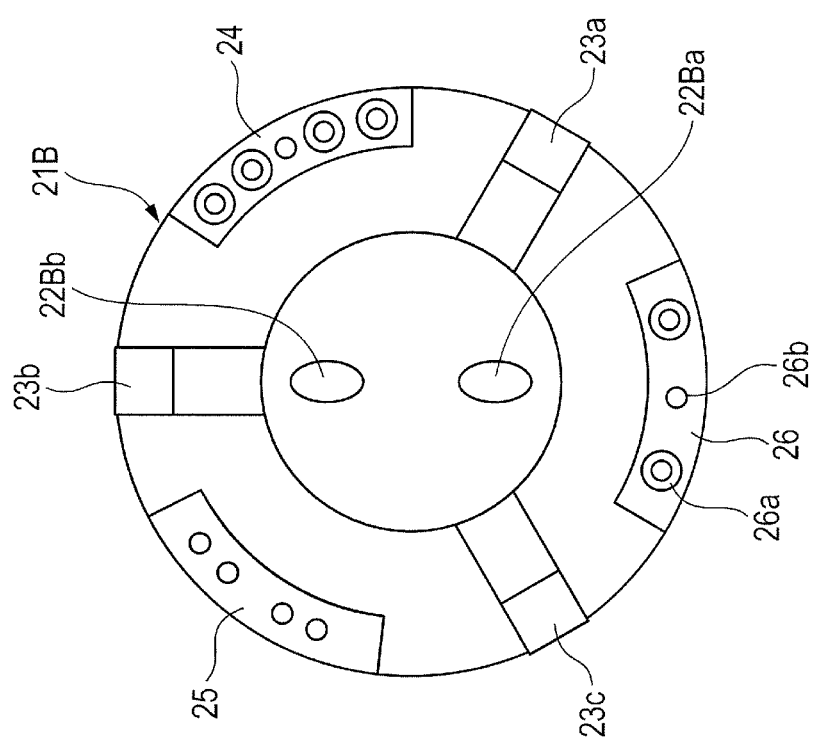

ROBOT DEVICE

BACKGROUND OF THE INVENTION

Field of the Invention

The present invention relates to a robot device including an arm, and more particularly, to a robot device including a replaceable end effector that is mounted to a distal end of an arm.

Description of the Related Art

In recent years, when a robot device is utilized to automatically assemble a precision component to a workpiece, in some cases, a tweezer hand for assembling a precision component and a camera for measuring the precision component are used to assemble the precision component while identifying the three-dimensional position of the precision component by the camera (see Japanese Patent Application Laid-Open No. 2011-011315).

For example, in a robot device disclosed in Japanese Patent Application Laid-Open No. 2011-011315, a stereo camera mounted to the arm is focused on the tip of the tweezer hand, and the precision component is assembled to the workpiece while controlling the position of the tweezer hand with respect to the precision component.

By the way, when the camera is mounted to the arm or the hand, it is necessary to prevent the camera from coming into contact with stands for the workpiece and the precision component, protrusions in various work spaces, or the like, which significantly restricts the motion of the arm. In particular, during a work that does not require positional control by the camera, the camera is only an obstacle for the arm, and the work efficiency may be reduced due to the restriction. Further, when the camera is mounted to the arm, it is necessary to set the specification values, such as the weight capacity, of the arm to be large, and hence the downsizing of the robot device is inhibited.

Further, in recent years, because of the intensified product competition due to the diversified customer needs, the product tends to have a shorter life cycle, and a large variety of products have been created to respond to the diversified needs. Therefore, every time the product changes, the production line and the production device need to be newly constructed or changed. Thus, there has been a problem in that it costs too much to meet large-variety production. Therefore, there has been an increasing demand not only for automatic product manufacture, but also for a robot device having high versatility, which can be used for small-lot, large-variety production.

SUMMARY OF THE INVENTION

In view of the above, the present invention has an object to provide a small-sized robot device having high versatility without decreasing the work efficiency.

According to one embodiment of the present invention, there is provided a robot device including: a robot arm; an end effector including a stereo camera for measuring a three-dimensional position of a workpiece, the end effector performing a work with respect to the workpiece whose three-dimensional position has been measured by the stereo camera; and a connector provided on a distal end of the robot arm, the connector releasably connecting the end effector to the robot arm.

Further features of the present invention will become apparent from the following description of exemplary embodiments with reference to the attached drawings.

BRIEF DESCRIPTION OF THE DRAWINGS

FIGS. 11A and 11B are views illustrating transmission contact points of the hand of the second robot device according to the third embodiment.

DESCRIPTION OF THE EMBODIMENTS

First Embodiment

Now, a robot station 1 according to a first embodiment of the present invention is described with reference to FIGS. 1 to 4. Note that, in the following description, a hand (robot hand) refers to a member that is mounted to a distal end of an arm (robot arm) directly or through intermediation of a connecting mechanism that does not have a gripping function, and includes a mechanism with a gripping function. Further, a tool refers to a member that is used by being gripped by the hand, and includes a mechanism with a gripping function that is different from that of the hand.

Figure 1:
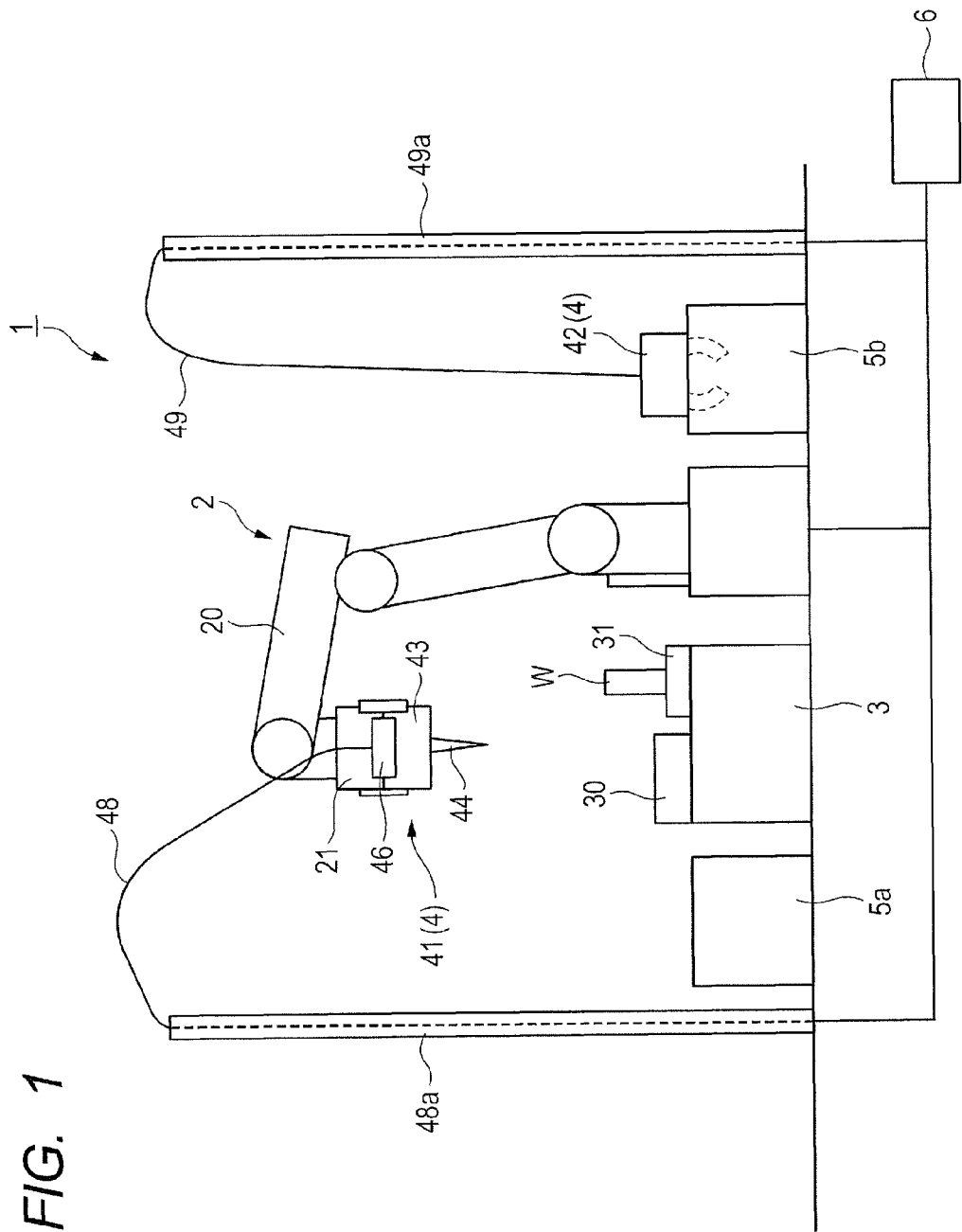
FIG. 1 is a schematic view illustrating a robot station according to a first embodiment of the present invention.
Figure 2:
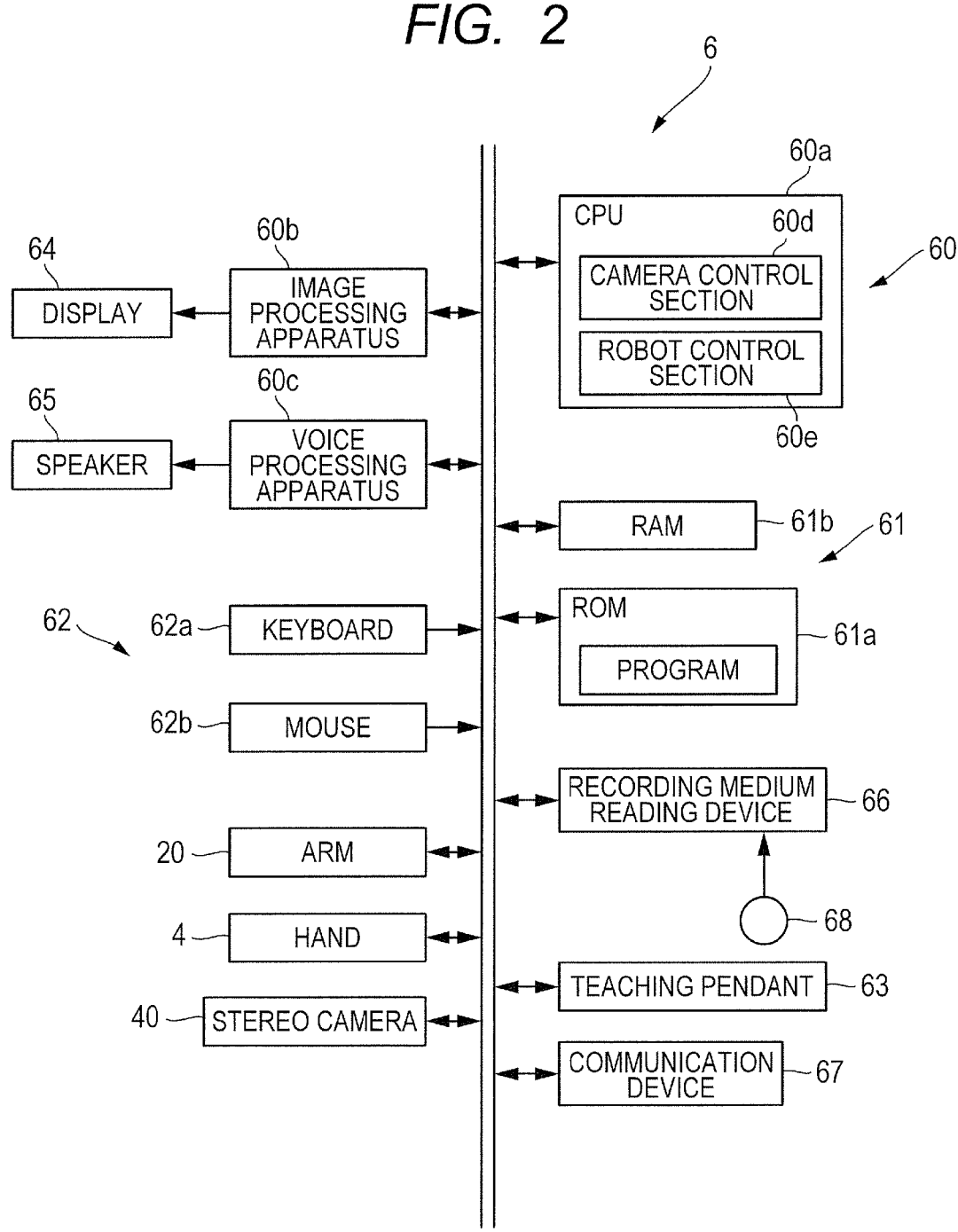
FIG. 2 is a block diagram of a controller for controlling a robot device according to the first embodiment.

First, the schematic configuration of the robot station 1 is described with reference to FIGS. 1 and 2. FIG. 1 is a schematic view illustrating the robot station 1 according to the first embodiment of the present invention. FIG. 2 is a block diagram of a controller 6 for controlling a robot device 2 according to the first embodiment.

As illustrated in FIG. 1, the robot station 1 includes the robot device 2 for assembling a workpiece W, a work table 3 on which the assembly of the workpiece W is performed, a first stand 5a and a second stand 5b for placing a hand 4 to be described later, and the controller 6 for controlling the robot device 2.

The robot device 2 includes a six-axis articulated arm 20, the hand 4 serving as an end effector connected to the distal end of the arm 20, and a connection portion 21 serving as a connector for connecting the hand 4 to the arm 20.

The arm 20 includes six actuators for driving respective joints to rotate about respective joint axes. By selectively driving the respective actuators, the hand 4 is moved to an arbitrary three-dimensional position.

The hand 4 is freely removable from the connection portion 21. In this embodiment, as the hand 4, a tweezer hand 41 for assembling a precision component, and a gripper hand 42 that grips the workpiece W for transportation or the like are prepared. Further, in the hand 4, a hand mechanism system and each type of tool associated therewith can be controlled via a common interface among various hands. With this, even when a different hand is mounted, the hand can be easily replaced without imposing a significant load on the system. Further, it is possible to respond easily to the system expansion. Note that, the hand 4 and the connection portion 21 are described in detail later.

The work table 3 is formed into a rectangular box shape, and includes a feed tray 30 in which the precision components to be assembled to the workpiece W are placed, and a stage 31 on which the workpiece W is placed. In this embodiment, a lens barrel as the workpiece W is placed on the stage 31, and the stage 31 is formed so that the lens barrel can be placed thereon.

The first stand 5a and the second stand 5b are each a stand for placing the hand 4 that is not mounted to the arm 20, and are arranged within a movable range of the robot device 2. In this embodiment, the tweezer hand 41 is placed on the first stand 5a, and the gripper hand 42 is placed on the second stand 5b. For example, as illustrated in FIG. 1, when the tweezer hand 41 is mounted to the arm 20, the gripper hand 42 is placed on the second stand 5b.

As illustrated in FIG. 2, the controller 6 includes a computation apparatus 60 and a storage apparatus 61 provided in a computer main body. The arm 20, the hand 4, and a stereo camera 46 are connected to the computer main body via a bus. Further, the computer main body is also connected to an input apparatus 62, a teaching pendant 63, a display 64, a speaker 65, a recording medium reading device 66, a communication device 67, and the like via the bus. Note that, in FIG. 2, an interface for establishing those connections is not illustrated.

The computation apparatus 60 includes a CPU 60a, an image processing apparatus 60b, and a voice processing apparatus 60c. The CPU 60a includes a camera control section 60d and a robot control section 60e. The camera control section 60d measures the three-dimensional positions of the workpiece W and the precision component based on various programs stored in the storage apparatus 61, settings input from the input apparatus 62, and the like. The robot control section 60e controls the arm 20 and the hand 4 based on the three-dimensional positions measured by the camera control section 60d, various programs stored in the storage apparatus 61, settings input from the input apparatus 62, and the like. Note that, detailed description is omitted for the measurement of the three-dimensional positions of the workpiece W and the precision component by the camera control section 60d, and for the control of the arm 20 and the hand 4 by the robot control section 60e.

The image processing apparatus 60b controls the display 64 in accordance with a render instruction from the CPU 60a to display a predetermined image on a screen. The voice processing apparatus 60c generates a voice signal in accordance with a sound instruction from the CPU 60a and outputs the voice signal to the speaker 65. The storage apparatus 61 is connected to the CPU 60a via the bus, and includes a ROM 61a that stores various programs, data, and the like, and a RAM 61b that is secured as a work area of the CPU 60a.

The input apparatus 62 includes a keyboard 62a and a mouse 62b, and can input information necessary for measurement of the three-dimensional position of the workpiece W, or other instructions. The recording medium reading device 66 is used to read a computer-readable recording medium 68 having various programs and the like recorded thereon, and to store the read information into the ROM 61a. The communication device 67 is used when, for example, without using the recording medium 68 described above, an update program to be delivered from the Internet or the like is downloaded via the communication device 67.

Figure 3:
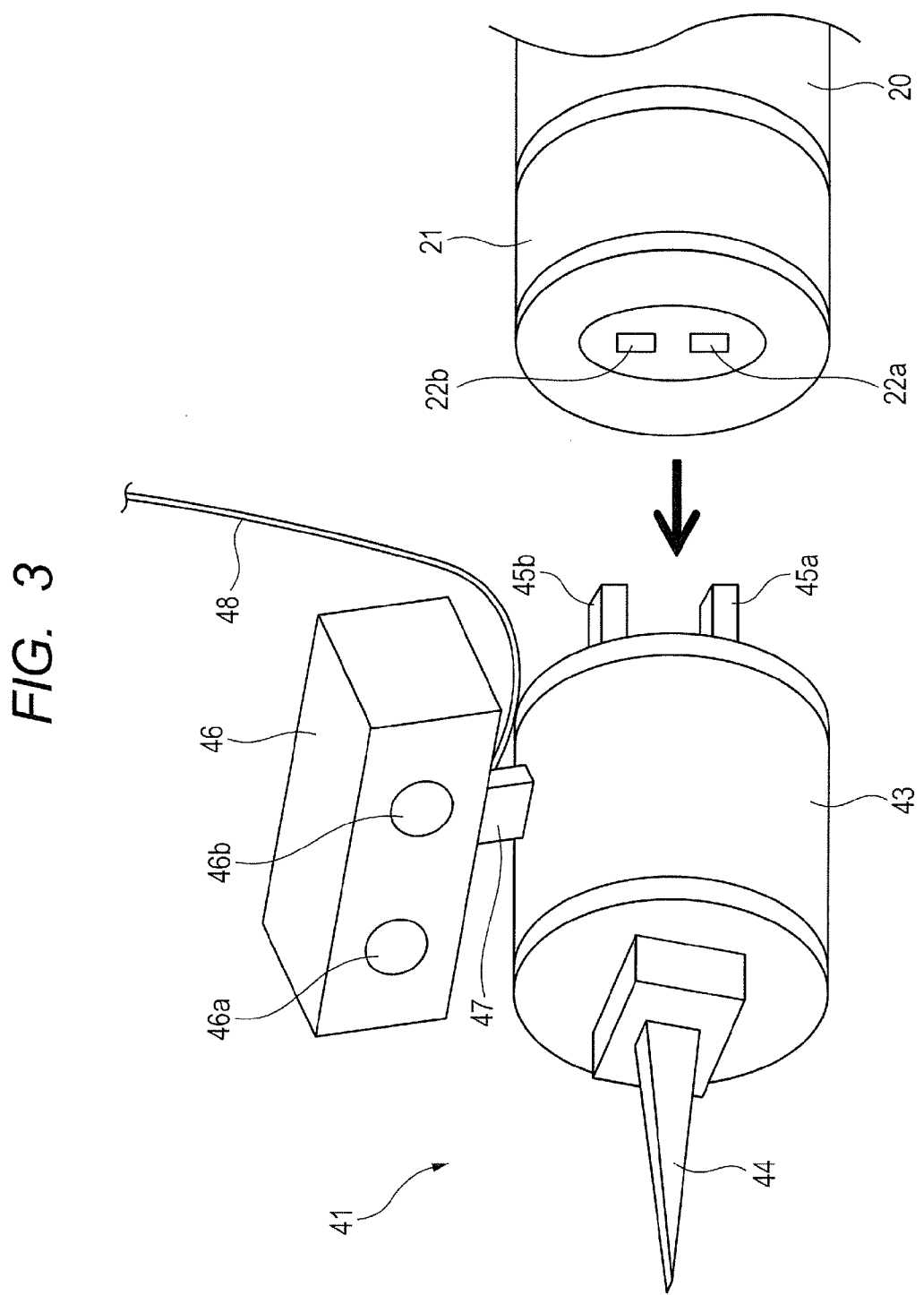
FIG. 3 is a schematic view illustrating a tweezer hand and a connection portion of the robot device according to the first embodiment.

Next, the hand 4 and the connection portion 21 according to the first embodiment are described with reference to FIG. 3 in addition to FIG. 1. FIG. 3 is a schematic view illustrating the tweezer hand 41 and the connection portion 21 of the robot device 2 according to the first embodiment. Note that, as for the hand 4, the tweezer hand 41 connected to the arm 20 in FIG. 3 is mainly described, and detailed description of the gripper hand 42 is therefore omitted herein.

As illustrated in FIG. 3, the tweezer hand 41 includes a tweezer hand main body 43, tweezers 44 for assembling the precision component, positioning pins 45a and 45b for connecting the tweezer hand 41 to the connection portion 21, and the stereo camera 46 for three-dimensionally measuring the workpiece W and the precision component. The stereo camera 46 is fixed to the tweezer hand main body 43 with a mounting bracket 47, and is set so that two lenses 46a and 46b are focused on the tip of the tweezers 44.

In this case, the stereo camera 46 is a measuring machine for measuring the three-dimensional position of the precision component. The positional accuracy required for assembly of the precision component is within ±50 μm, which is a very strict value. The positional measurement is performed with use of triangulation utilizing a distance between the two lenses 46a and 46b and the focal position of each of the two lenses 46a and 46b. Therefore, for accurate positional measurement, not only the distance between the two lenses 46a and 46b, but also the focal position of each lens needs to be accurately fixed. Therefore, a movable part such as AF may not exist in a lens optical system, and a focus depth of just about 30 mm can be taken, for example. With this, it is considered that, as for the stereo camera to be mounted to the hand, it is not recommendable to share a versatile stereo camera, but recommendable to provide a stereo camera whose focal position is specifically set for each hand.

In view of the above, in the present invention, the tweezer hand 41 integrally includes the stereo camera 46 and the tweezer hand main body 43 without intermediation of a movable part, and hence the position of the precision component held by the tweezers 44 can be measured with higher accuracy. Further, through the integral configuration, the stereo camera 46 does not remain on the arm 20 when the tweezer hand 41 is removed from the connection portion 21, and hence it is unnecessary to set a teaching point so that the stereo camera 46 does not hit against the feed tray 30 and the like. For example, it is unnecessary to set the teaching point so that, when the arm 20 moves to pick up the gripper hand 42 or the gripper hand 42 is used to move the workpiece W to the adjacent robot station, the stereo camera 46 does not hit against a pole 49a, the feed tray 30, or the like. As a result, for example, it is possible to save the time period required for change-over of the robot station, which is generated when the product is changed.

The connection portion 21 includes positioning holes 22a and 22b into which the positioning pins 45a and 45b provided to the tweezer hand 41 are inserted, and a fixing device (not shown) (for example, an electromagnetic solenoid) for fixing the positioning pins 45a and 45b after connection. The positioning holes 22a and 22b are each formed to have an entrance inner diameter that is larger than the outer diameter of each of the positioning pins 45a and 45b so that a clearance is provided for inserting the positioning pins 45a and 45b into the positioning holes 22a and 22b. Note that, the deep-side inner diameter of each of the positioning holes 22a and 22b is set so that no clearance as that at the entrance is provided. Thus, the position of the tweezer hand 41 is fixed when the positioning pins 45a and 45b are inserted into the positioning holes 22a and 22b, respectively. The fixing device is provided inside the connection portion 21, and performs an opening or closing operation to fix the positioning pins 45a and 45b inserted in the positioning holes 22a are 22b, respectively. As described above, in the connection portion 21, the fixing device is opened or closed to connect or release the tweezer hand 41 to or from the arm 20.

Next, an operation of assembling the precision component to the workpiece W by the robot device 2 according to the first embodiment is described. When the robot device 2 assembles the precision component in the feed tray 30 to the workpiece W, the tweezer hand 41 is connected to the connection portion 21 of the arm 20 to execute the operation of assembling the precision component. Then, for example, when a large member is roughly moved and transported, such as when the workpiece W is moved to the adjacent robot station or when the position of the workpiece W is changed, the gripper hand 42 is connected to the connection portion 21 of the arm 20 to execute the transportation operation.

Next, an operation of connecting the hand 4 to the arm 20 of the robot device 2 according to the first embodiment is described. When the tweezer hand 41 is to be mounted to the arm 20 of the robot device 2, the arm 20 is moved so that the connection portion 21 is located above the first stand 5a on which the tweezer hand 41 is placed. Then, the positioning pins 45a and 45b of the tweezer hand 41 are pushed into the positioning holes 22a and 22b of the connection portion 21. Thus, the tweezer hand 41 and the connection portion 21 are brought into close contact with each other by sandwiching the tweezer hand 41 and the connection portion 21 between the first stand 5a and the arm 20. At this time, clearances are provided in the respective positioning holes 22a and 22b, and hence the positioning pins 45a and 45b can be easily pushed therein. After the tweezer hand 41 and the connection portion 21 are brought into close contact with each other, the fixing device fixes the positioning pins 45a and 45b inserted in the positioning holes 22a and 22b. With this, the tweezer hand 41 is connected to the arm 20.

On the other hand, when the tweezer hand 41 is to be removed from the arm 20, the connected tweezer hand 41 is placed on the first stand 5a, and the fixation of the connection portion 21 by the fixing device is released. With this, the connection between the tweezer hand 41 and the connection portion 21 is released, and the tweezer hand 41 can be removed by moving the arm 20 away from the upper side of the first stand 5a.

Similarly, when the gripper hand 42 is to be mounted to the arm 20, the arm 20 is moved so that the connection portion 21 is located above the second stand 5b on which the gripper hand 42 is placed. Then, the positioning pins of the gripper hand 42 are pushed into the positioning holes 22a and 22b of the connection portion 21. In this manner, the gripper hand 42 and the connection portion 21 are brought into close contact with each other by sandwiching the gripper hand 42 and the connection portion 21 between the second stand 5b and the arm 20. At this time, clearances are provided in the respective positioning holes 22a and 22b, and hence the positioning pins can be easily pushed therein. After the gripper hand 42 and the connection portion 21 are brought into close contact with each other, the fixing device fixes the positioning pins inserted in the positioning holes 22a and 22b. With this, the gripper hand 42 is connected to the arm 20.

On the other hand, when the gripper hand 42 is to be removed from the arm 20, the connected gripper hand 42 is placed on the second stand 5b, and the fixation of the connection portion 21 by the fixing device is released. With this, the connection between the gripper hand 42 and the connection portion 21 is released, and the gripper hand 42 can be removed by moving the arm 20 away from the upper side of the second stand 5b.

In this case, when various hands are changed depending on the application, how to feed power to the hand 4 and how to control the hand 4 become an issue. In this embodiment, the power feeding and control for the various hands are performed via cables 48 and 49. Further, when the cables 48 and 49 are used to control the hand 4, inappropriate routing of the cables 48 and 49 becomes a problem because the cables 48 and 49 may be tangled with the arm 20 or the like. This problem is solved by providing poles 48a and 49a as cable hangers for hanging down the cables 48 and 49 from positions higher than the maximum movable height of the arm 20. Thus, the inappropriate routing of the cables 48 and 49 is avoided (see FIG. 1). Note that, the poles 48a and 49a include tension mechanisms for pulling up the cables 48 and 49, respectively. With this, for example, the cables 48 and 49 are prevented from being tangled with the arm 20 or the like by being dragged on the work table 3 or the floor due to the motion of the arm 20. As a result, the movable range of the arm 20 is not unnecessarily restricted, and it becomes easy to set the teaching point of the arm 20. Note that, the tweezer hand 41 needs, in addition to a cable for control of the tweezers 44, an image transmission cable for transmitting a signal of information on an image from the stereo camera 46. However, this problem may be solved by collecting the image transmission cable, a control cable connected to the controller as a control apparatus, and the power cable connected to a power feeding apparatus (not shown) into a single cable sheath as the cable 48.

Further, the various hands are controlled not through mechanical connection, but through a form that uses an electrical interface for electrical connection to the controller inside the hand. With this, the various hands can be controlled in common, and the gripping force and the accuracy can be freely changed in accordance with the precision component to be assembled.

As described above, in the robot station 1 according to the first embodiment, it is unnecessary to prepare separate arms in accordance with various work steps, and thus the efficiency in use of the arm can be improved. Further, by providing dedicated hands for the respective various steps, the various steps can be supported, and in small-lot, large-variety production, a time period required for change-over of the robot station, which is generated when the product is changed, can be saved. For example, by replacing the hand part during the step, the step of assembling the precision component to the workpiece W and the step of transporting the workpiece W can be performed by the same robot device 2, and thus the robot device 2 can be used efficiently. As a result, a small-sized robot device having high versatility can be provided without decreasing the work efficiency.

Figure 4:
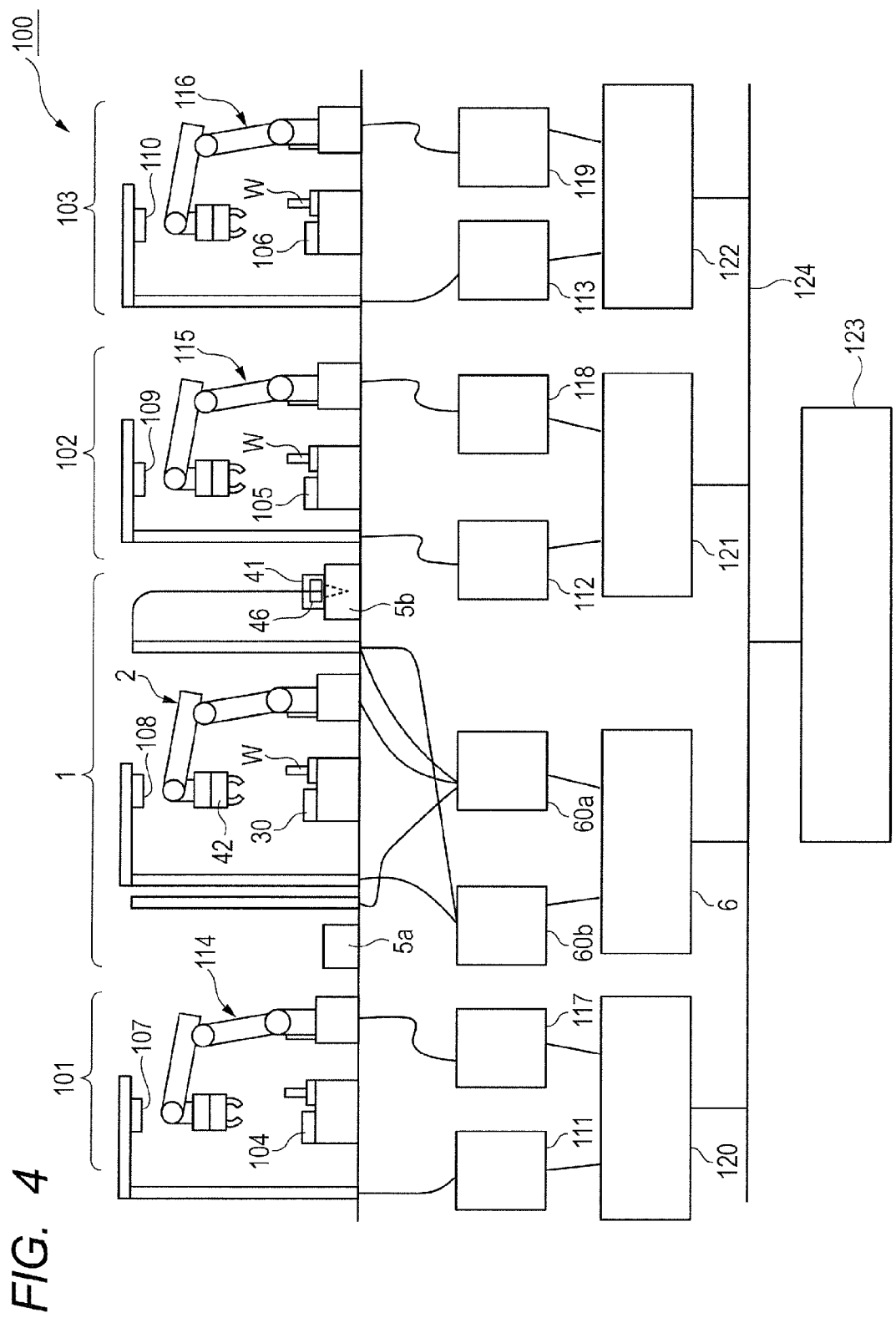
FIG. 4 is a schematic view illustrating a robot system including the robot station according to the first embodiment and multiple other robot stations.

Next, a robot system 100 obtained by combining the robot station 1 according to the first embodiment and existing robot stations 101, 102, and 103 each including a fixed hand is described with reference to FIG. 4. FIG. 4 is a schematic view illustrating the robot system 100 including the robot station 1 according to the first embodiment and the multiple other robot stations 101, 102, and 103.

As illustrated in FIG. 4, the robot system 100 includes the robot station 1 according to the first embodiment, which includes a freely removable hand, and the multiple robot stations 101, 102, and 103 each including a fixed hand. The multiple robot stations 101, 102, and 103 are robot stations that correspond to various steps, and each have a configuration similar to that of the robot station 1 except that the hand is fixed to the arm.

Above feed trays 30, 104, 105, and 106 of the robot stations 1, 101, 102, and 103, global cameras 107, 108, 109, and 110 for detecting presence and absence of the assembly component, misalignment of the assembly component, or the like are mounted, respectively. Images taken by the global cameras 107, 108, 109, and 110 are sent to image processing apparatus 60b, 111, 112, and 113 via general interfaces, respectively, and are processed into presence and absence information of the assembly component and misalignment information of the assembly component based on an image processing program. Note that, an image taken by the stereo camera 46 provided in the tweezer hand 41 is also sent to the image processing apparatus 60b through connection via a dedicated interface, and is processed into necessary positional information.

The power feeding and control of robot devices 114, 115, and 116 of the robot stations 101, 102, and 103 are performed through the power cables and the control cables arranged in the arms, respectively. Then, the robot devices 2, 114, 115, and 116 perform control of the position of a motor (actuator), control of the gripping force, trajectory calculation of the arm and the hand, etc., by CPUs 60a, 117, 118, and 119 based on control signals input through the control cables, respectively.

Controllers 6, 120, 121, and 122 each perform teaching of the robot, robot language processing, and correction of the shift of the robot coordinates from the vision coordinates. Further, the controllers 6, 120, 121, and 122 perform, for the respective robot stations 1, 101, 102, and 103, a step teaching operation, a program operation, a correction operation between the robot teaching point and the vision, and error monitoring.

A system controller 123 is connected to the controllers 6, 120, 121, and 122 via a network 124, and performs control of cooperative operation among the respective robot stations 1, 101, 102, and 103, control of the entire robot system, error monitoring, and operation management.

As described above, in the robot station 1, the hand part is formed as a tool that may be replaced during the steps. Therefore, the step of assembling the precision component and the transportation operation can be performed by the same robot device. As a result, the arm 20 can be efficiently used in the robot station 1.

Second Embodiment

Next, a robot station 1A according to a second embodiment of the present invention is described with reference to FIGS. 5 to 8. The second embodiment is different from the first embodiment in that the hand serves as the connector. Therefore, in the second embodiment, the difference from the first embodiment, that is, the hand serving as the connector is mainly described. The same components as those in the first embodiment are represented by the same reference symbols, and description thereof is therefore omitted herein.

Figure 5:
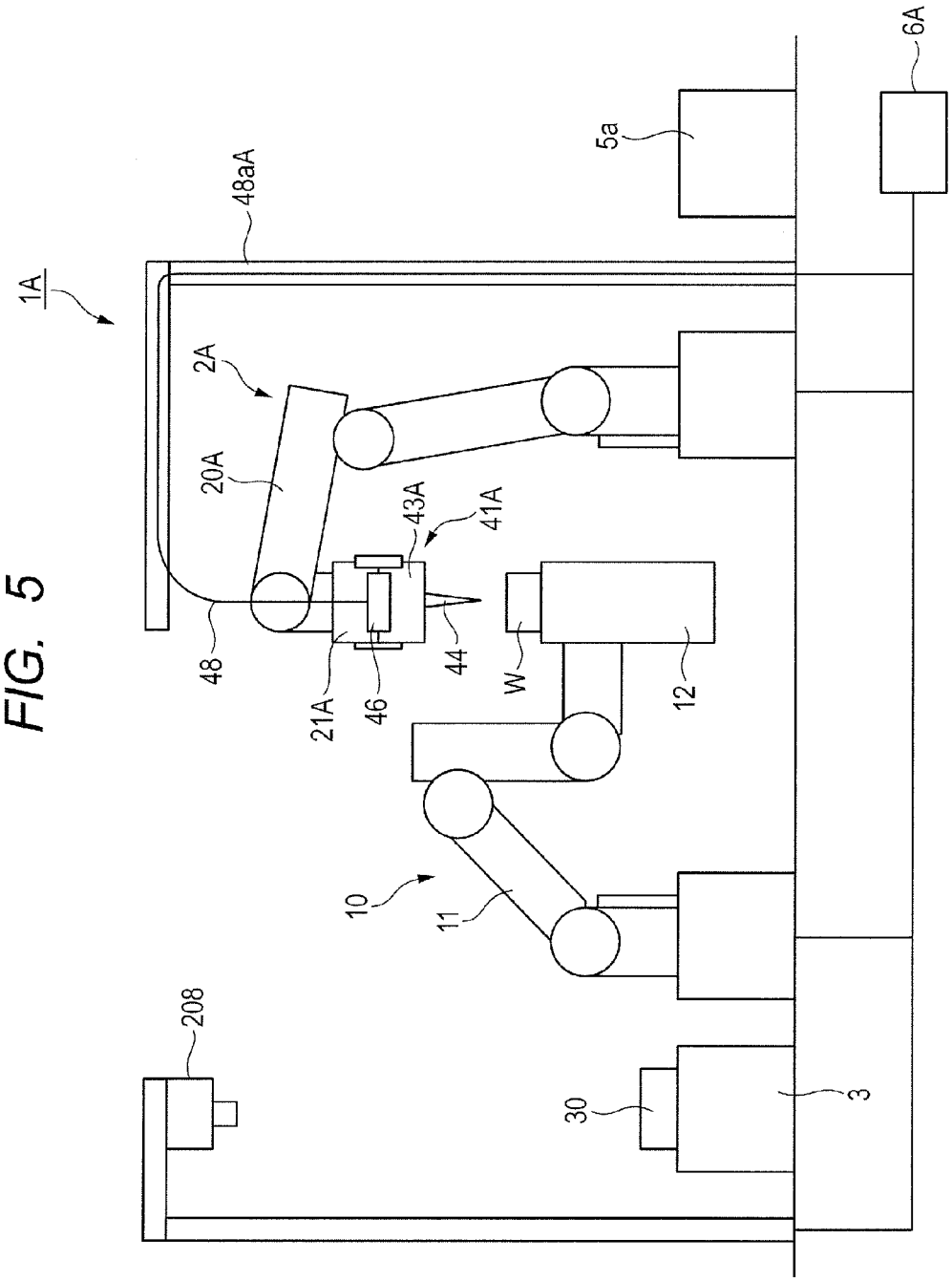
FIG. 5 is a schematic view illustrating a robot station according to a second embodiment of the present invention.
Figure 6:
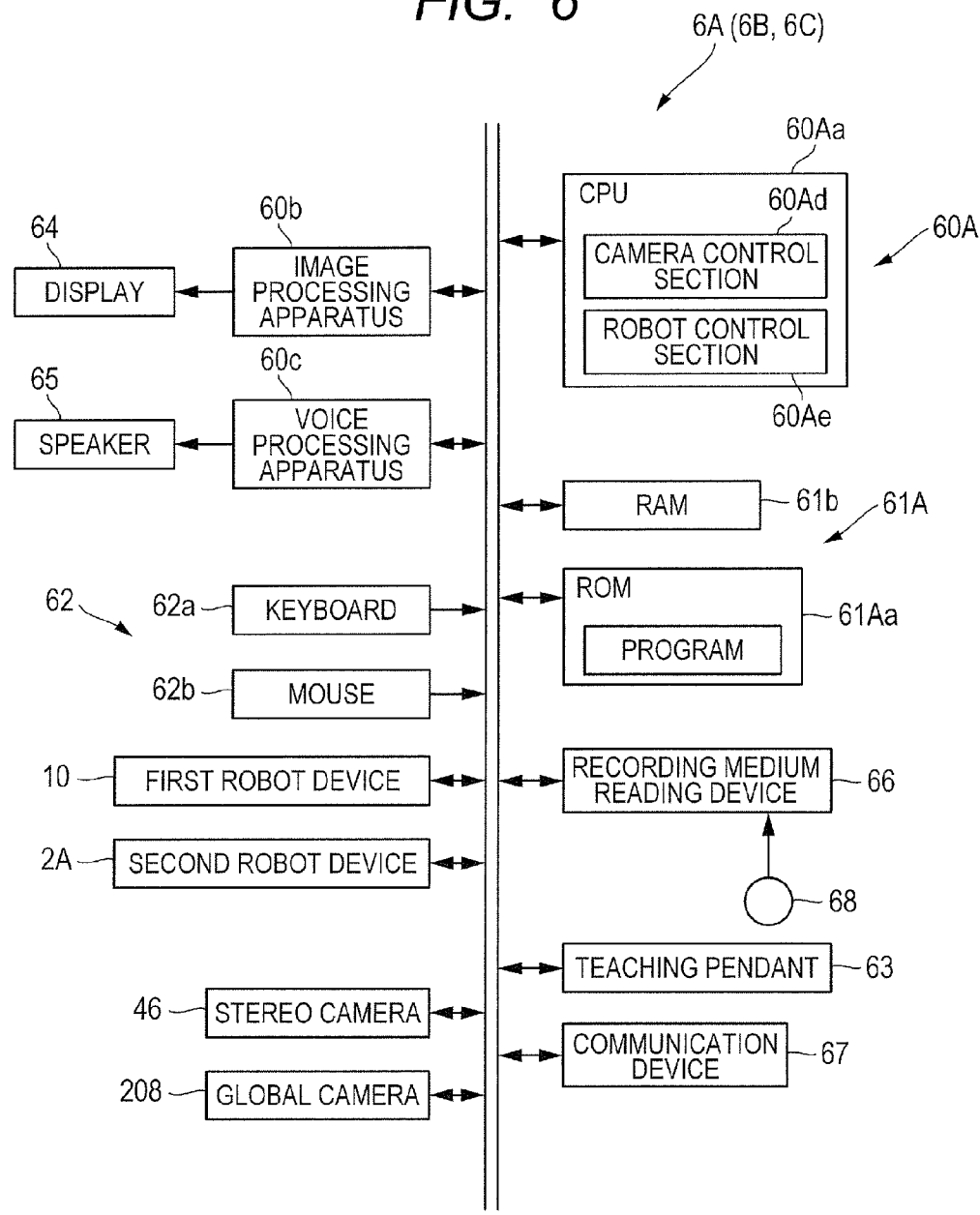
FIG. 6 is a block diagram of a controller for controlling a first robot device and a second robot device according to the second embodiment.

First, the configuration of the robot station 1A is described with reference to FIGS. 5 and 6. FIG. 5 is a schematic view illustrating the robot station 1A according to the second embodiment of the present invention. FIG. 6 is a block diagram of a controller 6A for controlling a first robot device 10 and a second robot device 2A according to the second embodiment.

As illustrated in FIG. 5, the robot station 1A includes the first robot device 10 for gripping the workpiece W, the second robot device 2A for assembling a precision component to the workpiece W, and the work table 3 on which the assembly of the workpiece W is performed. Further, the robot station 1A includes a global camera 208 for detecting the precision component to be assembled to the workpiece W, the stand 5a for placing a tweezer tool 41A to be described later, and the controller 6A for controlling the first robot device 10 and the second robot device 2A.

The first robot device 10 includes a six-axis articulated arm 11, and a hand 12 for gripping the workpiece W. The arm 11 includes six actuators for driving respective joints to rotate about respective joint axes. By selectively driving the respective actuators, the hand 12 is moved to an arbitrary three-dimensional position. The hand 12 is mounted to a distal end of the arm 11, and includes three hand claws that are freely movable from three different points toward a center position. The hand 12 moves the three hand claws from the outer side toward the center point to grip the workpiece W located at the center position, and moves the three hand claws from the center point side to the outer side to release the gripped workpiece W.

The second robot device 2A includes a six-axis articulated arm 20A, and the tweezer tool 41A serving as an end work tool connected to a distal end of the arm 20A. Further, the second robot device 2A includes a hand 21A serving as the connector for connecting the tweezer tool 41A to the arm 20A. The arm 20A includes six actuators for driving respective joints to rotate about respective joint axes. By selectively driving the respective actuators, the tweezer tool 41A and the hand 21A are moved to an arbitrary three-dimensional position. The tweezer tool 41A and the hand 21A moved to the arbitrary position perform a predetermined work such as assembly of the precision component at the arbitrary position.

As described above, the robot station 1A according to the second embodiment performs an assembly operation based on so-called dual arm cooperative control, in which the first robot device 10 grips the workpiece W and the second robot device 2A assembles the precision component to the workpiece W. Note that the tweezer tool 41A and the hand 21A of the second robot device 2A are described in detail later.

The global camera 208 is mounted at a position above the feed tray 30, and detects the presence and absence, posture, position, and the like of the precision component to be assembled to the workpiece W. An image taken by the global camera 208 is sent to the image processing apparatus 60b via a general interface, and is processed into presence and absence information of the precision component and misalignment information of the precision component based on the image processing program. Note that, an image taken by the stereo camera 46 provided in the tweezer tool 41A is also sent to the image processing apparatus 60b through connection via a dedicated interface, and is processed into necessary positional information.

As illustrated in FIG. 6, the controller 6A includes a computation apparatus 60A and a storage apparatus 61A provided in a computer main body. The first robot device 10, the second robot device 2A, the stereo camera 46, the global camera 208, and the like are connected to the computer main body via a bus. The computation apparatus 60A includes a CPU 60Aa, the image processing apparatus 60b, and the voice processing apparatus 60c. The CPU 60Aa includes a camera control section 60Ad and a robot control section 60Ae.

The camera control section 60Ad measures the three-dimensional positions of the workpiece W and the precision component based on various programs stored in the storage apparatus 61A (for example, a ROM 61Aa), settings input from the input apparatus 62, and the like. The robot control section 60Ae controls the first robot device 10 and the second robot device 2A based on the three-dimensional positions measured by the camera control section 60Ad, various programs stored in the storage apparatus 61A, settings input from the input apparatus 62, and the like. Note that, detailed description is omitted for the measurement of the three-dimensional positions of the workpiece W and the precision component by the camera control section 60Ad, and for the control of the first robot device 10 and the second robot device 2A by the robot control section 60Ae.

Figure 7:
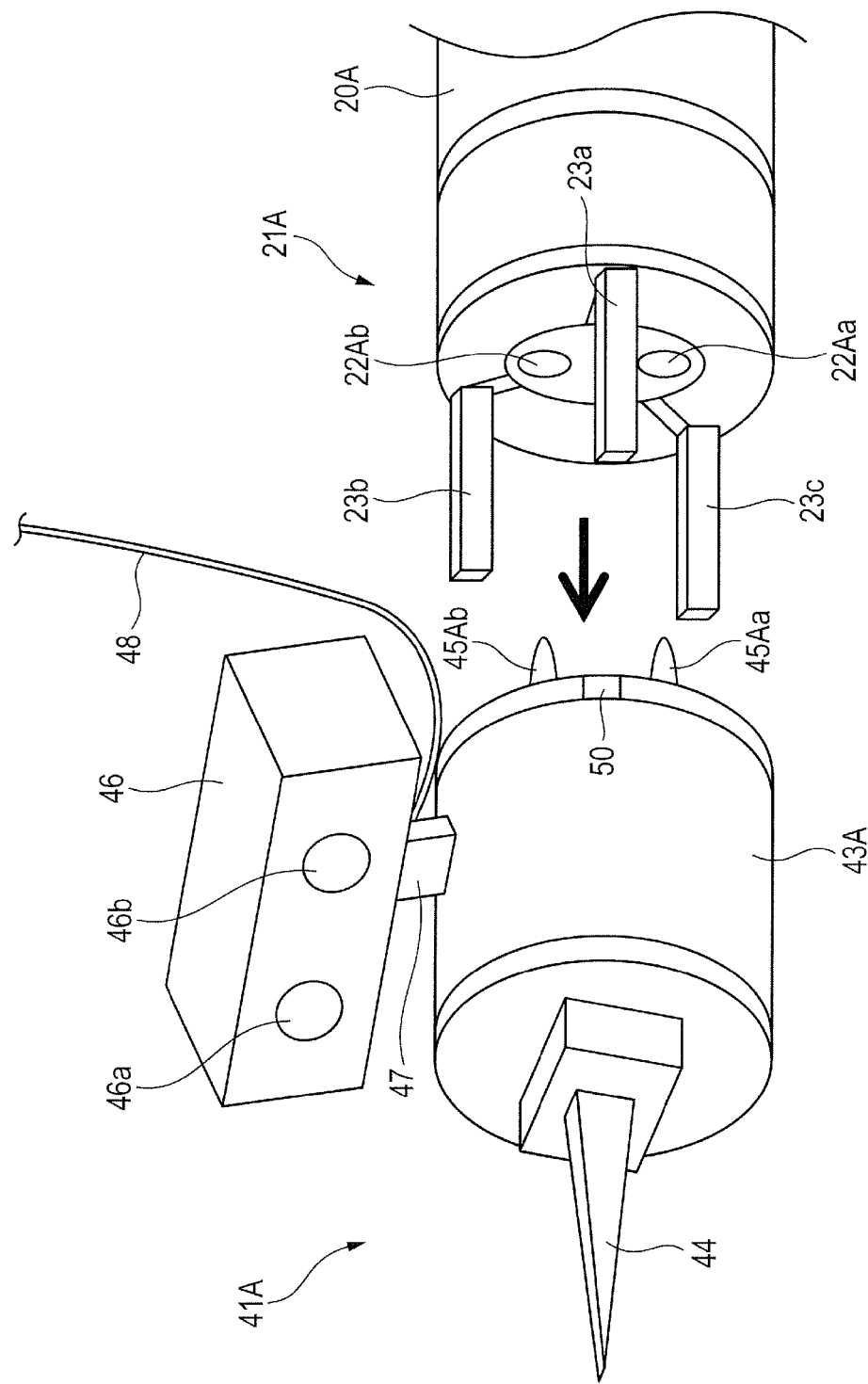
FIG. 7 is a schematic view illustrating a tweezer tool and a hand of the second robot device according to the second embodiment.

Next, the tweezer tool 41A and the hand 21A according to the second embodiment are described with reference to FIG. 7 in addition to FIG. 5. FIG. 7 is a schematic view illustrating the tweezer tool 41A and the hand 21A of the second robot device 2A according to the second embodiment.

As illustrated in FIG. 7, the tweezer tool 41A includes a tweezer tool main body 43A, the tweezers 44, positioning pins 45Aa and 45Ab for connecting the tweezer tool 41A to the hand 21A, and the stereo camera 46.

The tweezer tool main body 43A includes gripping grooves 50 serving as guide grooves for guiding, to positions for the connection, three hand claws 23a, 23b, and 23c serving as multiple hand claws to be described later when connecting the tweezer tool 41A to the hand 21A. In this embodiment, three gripping grooves 50 are provided, which correspond to the three hand claws 23a, 23b, and 23c. The gripping grooves 50 guide the hand 21A in a direction for the connection, and prevent a slip of the hand 21A by fitting the hand 21A to the gripping grooves 50 at the positions for the connection. The tweezers 44 are supported by the tweezer tool main body 43A so that the center of gripping is located on an axial line at the center position of the tweezer tool main body 43A. The positioning pins 45Aa and 45Ab are formed so as to be insertable into positioning holes 22Aa and 22Ab of the hand 21A to be described later, respectively. When the positioning pins 45Aa and 45Ab are inserted into the positioning holes 22Aa and 22Ab, respectively, the tweezer tool 41A is positioned with respect to the hand 21A.

The stereo camera 46 is fixed to the tweezer tool main body 43A with the mounting bracket 47, and is set so that the two lenses 46a and 46b are focused on the tip of the tweezers 44. The tweezer tool 41A integrally includes the stereo camera 46 and the tweezer tool main body 43A without intermediation of a movable part, and hence the position of the precision component held by the tweezers 44 can be measured with higher accuracy.

In this case, all the conditions of the tweezer tool 41A need to be controlled in an electrical manner, and hence three cables, specifically, a power cable for feeding power, an image transmission cable for transmitting a signal on a taken image, and a control cable for controlling the tweezers 44 are necessary for the tweezer tool 41A. Those three cables are collected into a single sheath as the dedicated cable 48. The cable 48 is supported by a cable supporting portion 48aA serving as the cable hanger from the ceiling side, and is subjected to a constant tension. Therefore, for example, the cable 48 is prevented from being tangled with the arm 20A or the like by being dragged on the work table 3 or the floor due to the drive of the arm 20A. Thus, the movable range of the arm 20A is not unnecessarily restricted. As a result, for example, it becomes possible to easily set the teaching point of the arm 20A.

The hand 21A includes, for example, the three hand claws 23a, 23b, and 23c for gripping the workpiece W, and the positioning holes 22Aa and 22Ab. The three hand claws 23a, 23b, and 23c are freely movable from different points toward a center position. The three hand claws 23a, 23b, and 23c move from the outer side toward the center point to grip the tweezer tool main body 43A, and move from the center point side to the outer side to release the tweezer tool main body 43A.

Further, the hand claws 23a, 23b, and 23c also function as a hand suited to grip a cylindrical workpiece such as a lens barrel as well as the function of gripping the tweezer tool main body 43A. For example, in the case of the cylindrical workpiece such as a lens barrel, the center position can be determined depending on the accuracy of the hand claws 23a, 23b, and 23c. This accuracy is determined based on the accuracy of machining the hand claws 23a, 23b, and 23c, and hence extremely high accuracy can be obtained. Therefore, the positioning holes 22Aa and 22Ab do not need to strictly conform to the cross-sectional shape of the positioning pins 45Aa and 45Ab, respectively. In order to smoothly perform the insertion and removal of the positioning pins 45Aa and 45Ab, the positioning holes 22Aa and 22Ab have clearances provided between the positioning holes 22Aa and 22Ab and the positioning pins 45Aa and 45Ab, respectively, in a direction different from the direction of the opening and closing movement of the three hand claws 23a, 23b, and 23c.

Further, the hand claws 23a, 23b, and 23c may also perform a transportation work for directly gripping, for example, the lens barrel gripped by the first robot device 10, and transporting the lens barrel to an adjacent robot station. Still further, the center of gripping of the tweezers 44 of the tweezer tool 41A is determined on the axial line at the center position of the tweezer tool main body 43A, and hence, when the tweezer tool 41A is gripped by the hand claws 23a, 23b, and 23c, the center position of the opening and closing movement of the hand claws 23a, 23b, and 23c and the center of gripping of the tweezers 44 are aligned on substantially the same axial line. The position of the tweezer tool 41A in the rotational direction about the axis thereof is determined by the positioning pins 45Aa and 45Ab, and hence the accuracy of the gripping position can be maintained at high level with high reproducibility.

Figure 8:
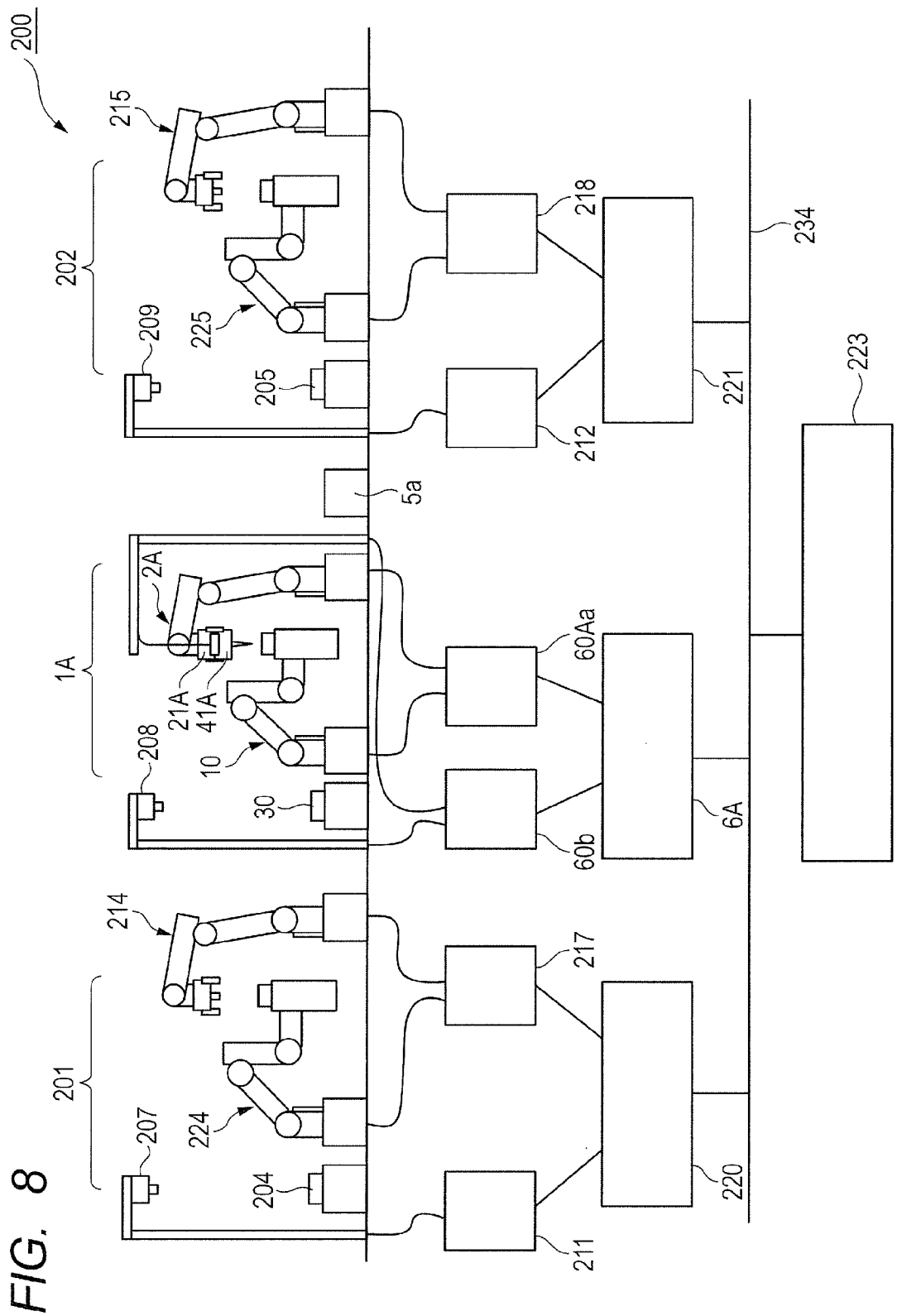
FIG. 8 is a schematic view illustrating a robot system including the robot station according to the second embodiment and multiple other robot stations.

Next, a robot system 200 obtained by combining the robot station 1A according to the second embodiment and existing robot stations 201 and 202 each including a fixed hand is described with reference to FIG. 8. FIG. 8 is a schematic view illustrating the robot system 200 including the robot station 1A according to the second embodiment and the multiple other robot stations 201 and 202.

As illustrated in FIG. 8, the robot system 200 includes the robot station 1A according to the second embodiment, which includes the freely removable tweezer tool 41A, and the multiple robot stations 201 and 202 each including a fixed hand. The multiple robot stations 201 and 202 are robot stations that correspond to various steps, and each have a configuration similar to that of the robot station 1A except that the tweezer tool 41A is not provided.

Above feed trays 30, 204, and 205, global cameras 207, 208, and 209 are mounted, respectively. Images taken by the global cameras 207, 208, and 209 are sent to image processing apparatus 60b, 211, and 212, respectively, and are processed into presence and absence information of the assembly component and posture and position information of the assembly component based on an image processing program. Note that, an image taken by the stereo camera 46 provided in the tweezer tool 41A is also sent to the image processing apparatus 60b through connection via a dedicated interface, and is processed into necessary positional information.

The power feeding and control of first robot devices 10, 224, and 225, and second robot devices 2A, 214, and 215 of the robot stations 1A, 201, and 202 are performed through the power cables and the control cables arranged in the arms, respectively. The first robot devices 10, 224, and 225, and the second robot devices 2A, 214, and 215 perform control of the position of a motor, control of the gripping force, trajectory calculation of the arm and the hand, etc., by CPUs 60Aa, 217, and 218 based on control signals input through the control cables, respectively.

Controllers 6A, 220, and 221 each perform teaching of the robot, robot language processing, and correction of the shift of the robot coordinates from the vision coordinates. Further, the controllers 6A, 220, and 221 perform, for the respective robot stations 1A, 201, and 202, a step teaching operation, a program operation, a correction operation between the robot teaching point and the vision, and error monitoring.

A system controller 223 is connected to the controllers 6A, 220, and 221 via a network 234, and performs control of cooperative operation among the respective robot stations 1A, 201, and 202, control of the entire robot system, error monitoring, and operation management.

As described above, according to this embodiment, also in the case of using the freely removable tool (for example, the tweezer tool 41A), the connection mechanism therefor can be used for transporting the workpiece W. Therefore, there is no need to secure a time period for replacing the freely removable tool with another tool suited to the workpiece W, with the result that the tact time of the robot station 1A can be reduced.

Further, the stereo camera 46 is fixed to the tweezer tool main body 43A, and hence the accuracy of the positioning between the arm 20A and the tip of the tweezer tool 41A that performs the assembly work for the precision component can be enhanced. For example, the positional accuracy between the arm 20A and the tweezer tool 41A is determined by fitting the positioning pins 45Aa and 45Ab of the tweezer tool 41A into the positioning holes 22Aa and 22Ab of the arm 20A, respectively.

The tweezer tool 41A is provided at a freely removable position, and hence the positioning pins 45Aa and 45Ab need to have a given size of clearances for smoothly performing the insertion and removal of the positioning pins 45Aa and 45Ab, which raises an issue with the positioning accuracy. However, in this embodiment, the hand 21A includes the three hand claws 23a, 23b, and 23c that are movable toward the center point of the hand 21A, and the straight line connecting the center point to the tip of the tweezers 44 is orthogonal to the planar joining portion of the hand 21A. The tweezer tool 41A is connected to the hand 21A at the three coplanar gripping positions on the hand 21A through use of the three hand claws 23a, 23b, and 23c that move toward the center point, and thus the center position of the hand 21A can be aligned with the center position of the tweezers 44 with high accuracy. As a result, when fitting the positioning pins 45Aa and 45Ab into the positioning holes 22Aa and 22Ab, respectively, the accuracy only needs to be set strictly in the rotational direction about the axis that is defined at the center position, and hence the other portions between the positioning pins 45Aa and 45Ab and the positioning holes 22Aa and 22Ab can be used as the clearances. Thus, the decrease in accuracy can be suppressed while performing the connection smoothly.

Note that, in the above description, the hand claws 23a, 23b, and 23c of the hand 21A that are used in this embodiment also function as the hand for gripping the workpiece W. Such a function is suitable in the case where the workpiece W is a cylindrical workpiece such as a lens barrel. For example, when similar hand claws are provided to the arm 11 of the first robot device 10 to grip the cylindrical workpiece W, the center position of the lens barrel can be grasped accurately, and hence the center positions of both the workpieces W can be determined with high accuracy. As a result, for example, the work of fitting the cylindrical workpiece to the cylindrical workpiece can be performed easily without correcting the positions through use of the camera or the like.

Third Embodiment

Next, a robot station 1B according to a third embodiment of the present invention is described with reference to FIGS. 9 to 13. The third embodiment is different from the second embodiment in the manner of electrical connection of the tweezer tool. Therefore, in the third embodiment, the difference from the second embodiment, that is, the manner of electrical connection of the tweezer tool is mainly described. The same components as those in the second embodiment are represented by the same reference symbols, and description thereof is therefore omitted herein.

Figure 9:
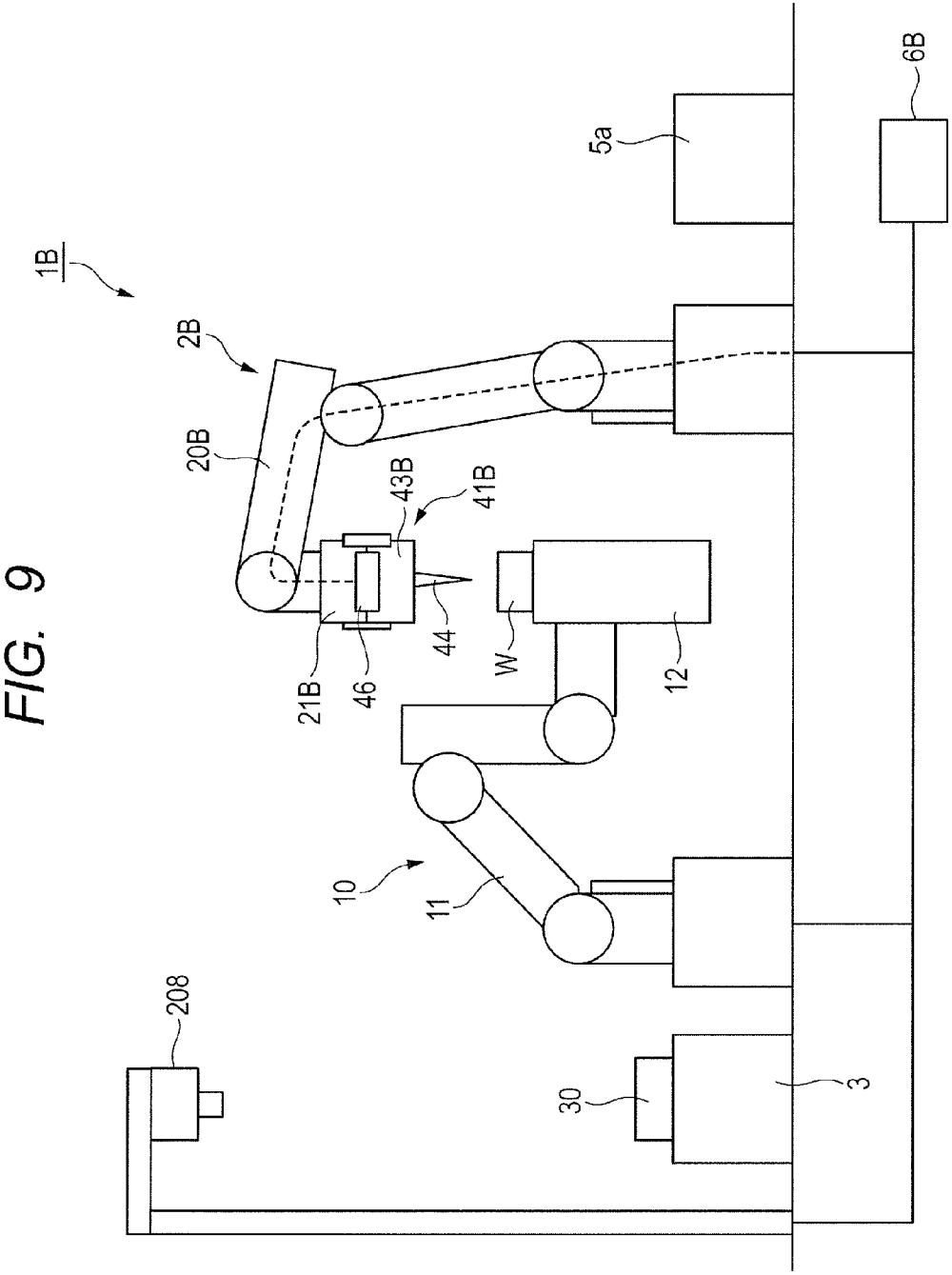
FIG. 9 is a schematic view illustrating a robot station according to a third embodiment of the present invention.
Figure 10:
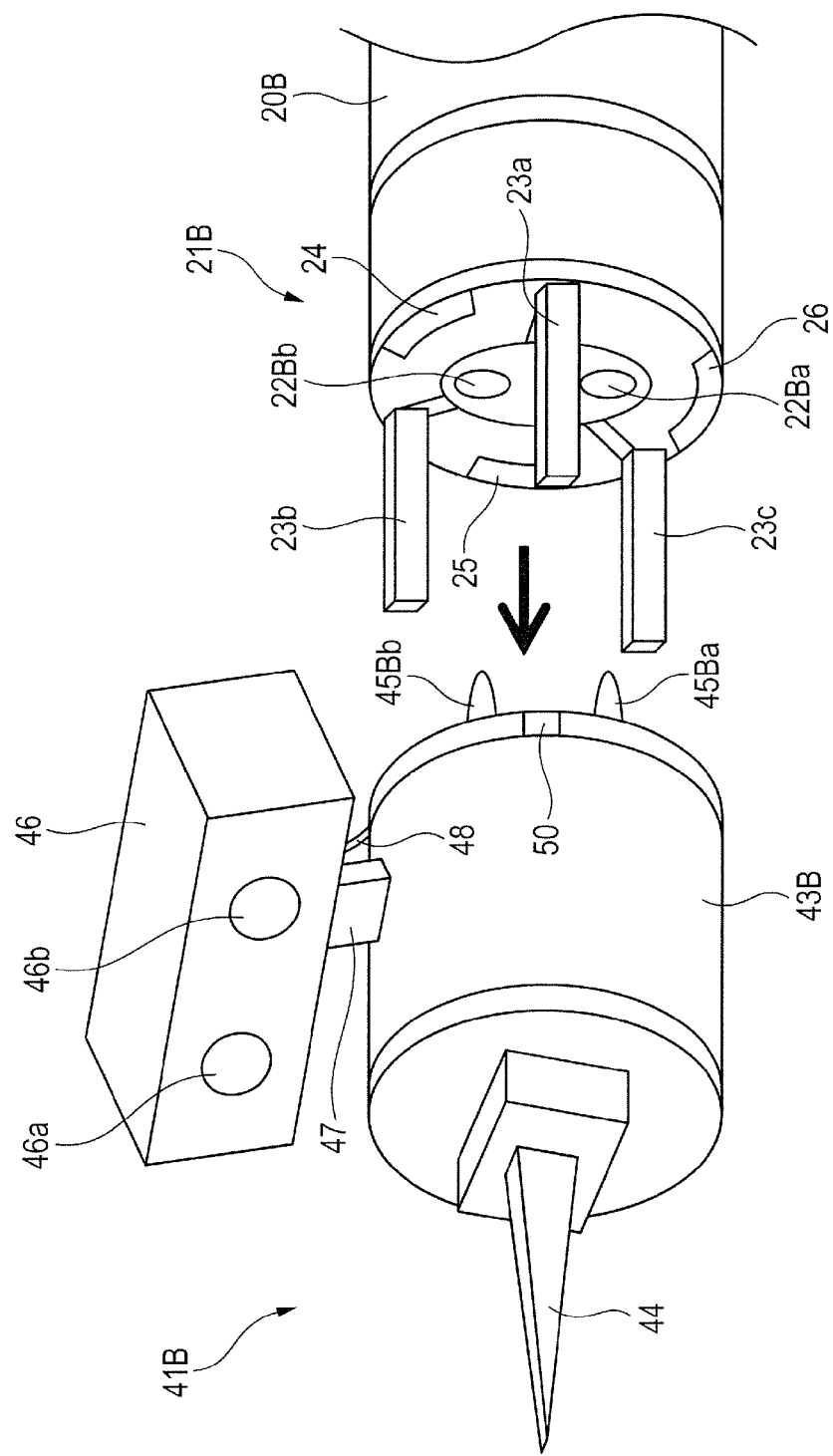
FIG. 10 is a schematic view illustrating a tweezer tool and a hand of a second robot device according to the third embodiment.

First, the configuration of the robot station 1B is described with reference to FIGS. 9 to 11B. FIG. 9 is a schematic view illustrating the robot station 1A according to the third embodiment of the present invention. FIG. 10 is a schematic view illustrating a tweezer tool 41B and a hand 21B of a second robot device 2B according to the third embodiment. FIGS. 11A and 11B are views illustrating transmission contact points of the hand 21B of the second robot device 2B according to the third embodiment.

As illustrated in FIG. 9, the robot station 1B includes the first robot device 10, the second robot device 2B for assembling a precision component to the workpiece W, the work table 3, the global camera 208, the stand 5a, and a controller 6B.

The second robot device 2B includes a six-axis articulated arm 20B, the tweezer tool 41B connected to a distal end of the arm 20B, and the hand 21B serving as the connector for connecting the tweezer tool 41B to the arm 20B. The arm 20B includes six actuators, and by selectively driving the respective actuators, the tweezer tool 41B and the hand 21B are moved to an arbitrary three-dimensional position. The tweezer tool 41B and the hand 21B moved to the arbitrary position perform, for example, assembly of the precision component at the arbitrary position.

As illustrated in FIG. 10, the tweezer tool 41B includes a tweezer tool main body 43B, the tweezers 44, positioning pins 45Ba and 45Bb, and the stereo camera 46. The hand 21B includes the three hand claws 23a, 23b, and 23c and positioning holes 22Ba and 22Bb.

In this case, all the image transmission cable, the power cable, and the control cable of the stereo camera 46 are temporarily collected into the tweezer tool main body 43B. The third embodiment has a feature in that the transmission contact points capable of electrically connecting and disconnecting the control cable, the power cable, and the image transmission cable are provided on the tweezer tool 41B side and the hand 21B side. Therefore, the hand 21B includes the transmission contact points, and the tweezer tool 41B includes transmission contact points (image signal transmitting terminal, control signal receiving terminal, and power receiving terminal) (not shown) that are connectable to the corresponding transmission contact points of the hand 21B.

As illustrated in FIGS. 11A and 11B, the transmission contact points are classified into an image transmitting contact point 24 serving as an image signal receiving terminal, a power feeding contact point 25 serving as a power feeding terminal, and a control signal transmitting contact point 26 serving as a control signal transmitting terminal. Note that, the transmission contact points are classified into three types because of the structure in which connection pins project as illustrated in FIG. 11B. The connection pins have such a mechanism that the connection is maintained due to a constant pressure applied by built-in springs at the time of the connection. Therefore, when the hand 21B grips the tweezer tool 41B, imbalance in pin pressure between the transmission contact points is eliminated so that the force is applied as evenly as possible when the hand 21B grips the tweezer tool 41B.

The two cameras of the stereo camera 46 are assigned with transmission signals, respectively, and hence the image transmitting contact point 24 includes two pairs of balanced transmission signal lines having a constant impedance, which are provided across a center ground pin. The power feeding contact point 25 includes a detection pin for detecting presence and absence of the connection of the contact point, which is provided in addition to a power feeding pin and a ground pin. The control signal transmitting contact point 26 includes a pair of balanced transmission lines 26a having a constant impedance, which is provided across a center ground pin 26b.

As illustrated in FIG. 11B, the balanced transmission line 26a of the tweezer tool 41B has an annular ground 1005 formed around a signal contact point 1003, and the balanced transmission line 26a of the hand 21B has an annular ground 1006 formed around a signal contact point 1004. With this configuration, each of the signal lines has a constant impedance with respect to the ground, and the balanced transmission lines 26a can be arranged with less strict positional accuracy of alignment between the contact points. The strokes among the ground pin 26b, a ground pin 1002, and the power feeding pin, the detection pin, and the ground pin of the power feeding contact point 25 are adjusted so that, at the time of contact point connection, those pins are brought into contact with the corresponding pins prior to the pins of the signal transmission contact points. Note that, in this embodiment, the tweezer tool 41B includes male transmission contact points, and the hand 21B includes female transmission contact points. Such a configuration is employed for the purpose of preventing, when the hand claws 23a, 23b, and 23c grip the workpiece W, distal ends of the pins of the transmission contact points from being damaged due to an impact of the workpiece W on the transmission contact points. Therefore, as long as any measures are taken, such as providing retractable contact points of the hand 21B, the male and female pins of the transmission contact points may be arranged in a reverse manner.

Further, in contact point transmission, an oxide film, dust, oil film, and the like that are generated over time may spontaneously adhere to portions of the contact points. This embodiment employs contact point pins structured to rotate when the transmission contact points are pushed, to thereby take a measure against the oxide film, dust, oil film, and the like. As other measures against the dust between the contact points, there may be employed a measure such as sliding the contact point pins at the time of gripping.

Figure 12:
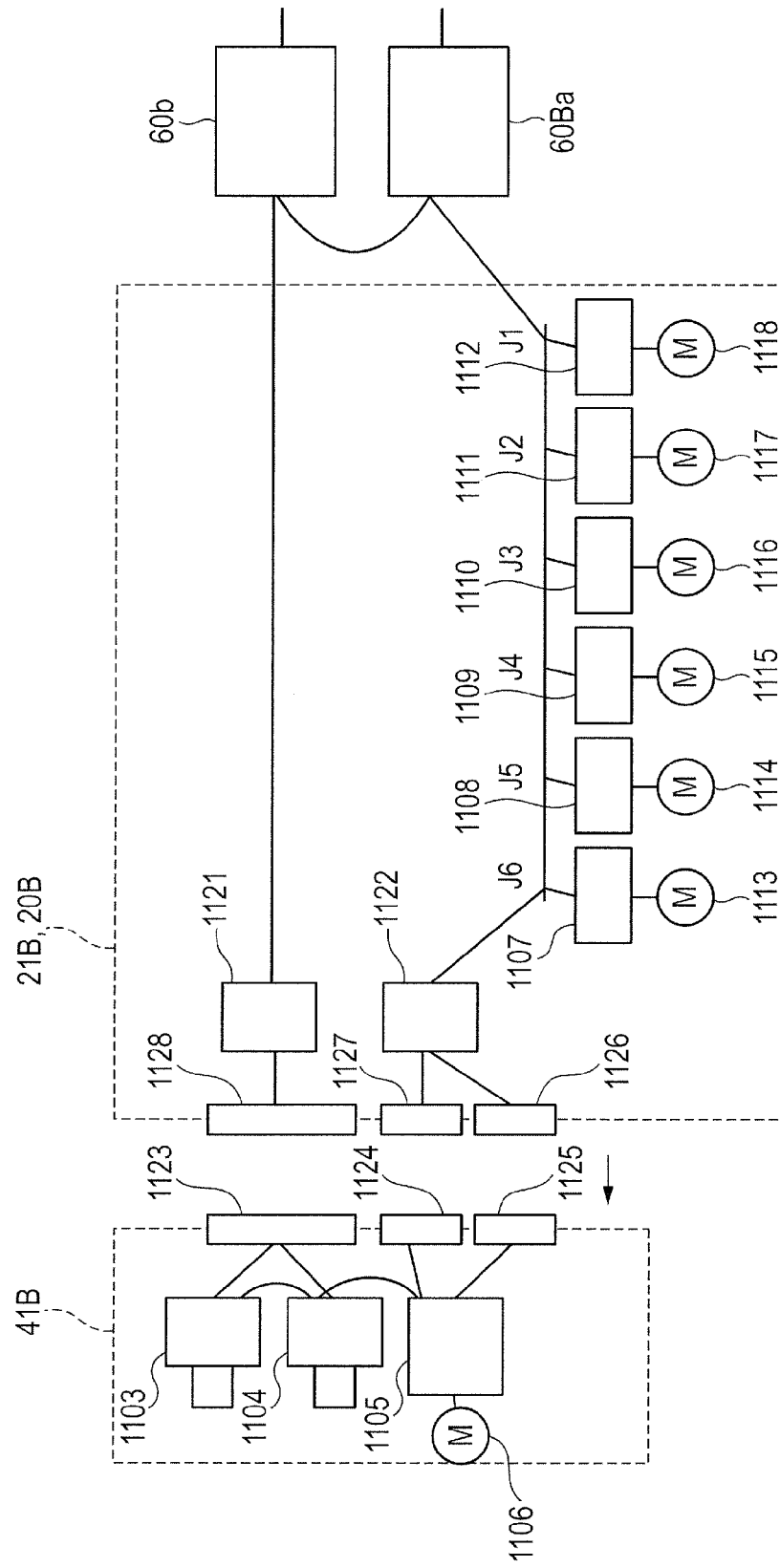
FIG. 12 is a block diagram of the transmission contact points of the second robot device according to the third embodiment.

As illustrated in FIG. 12, control cables of two cameras 1103 and 1104 mounted to the stereo camera 46 are connected to a control apparatus 1105 of the tweezer tool 41B, and control signals and power are supplied from the control apparatus 1105. Note that, the tweezers 44 of the tweezer tool 41B are connected to a motor 1106, and are driven by the motor 1106 to perform opening and closing movement.

Image transmission signals from the two cameras 1103 and 1104 are converted into high-speed serial signals, and are sent to an image transmission male contact point 1123. On the other hand, a control signal transmission male contact point 1124 and a power feeding male contact point 1125 are connected to the control apparatus 1105. A serial signal transmission repeater 1121 for transmitting the high-speed serial signals to the image processing apparatus 60b without deterioration amplifies the high-speed serial signals received at an image transmission female contact point 1128 and transmits the amplified high-speed serial signals again, to thereby minimize influence of signal deterioration due to the image transmission contact points. At the same time, the serial signal transmission repeater 1121 secures a long distance for signal transmission through the image transmission signal line extending from the arm 20B to the image processing apparatus 60b.

A hand control apparatus 1122 for controlling the connection to the control apparatus 1105 of the tweezer tool 41B is connected to a control signal transmission female contact point 1127 and a power feeding female contact point 1126 corresponding to the control signal transmission male contact point 1124 and the power feeding male contact point 1125 of the tweezer tool 41B, respectively. Control cables of the arm 20B and the hand 21B control connection and disconnection of the interfaces in the operating state, and use the signal from the contact point connection detection pin built in the power feeding female contact point 1126 to control the start of power feeding to the tweezer tool 41B at the time of connection. Through the power feeding start control, it is possible to prevent sparks from being generated between the contact points due to the power feeding before secure connection is established between the contact points, and therefore greatly prolong the life of the contact points.

Further, the hand control apparatus 1122 controls the hand claws 23a, 23b, and 23c. The hand control apparatus 1122 and motor control apparatus 1107 to 1112 for respectively controlling motors 1113 to 1118 of axes J6 to J1, which are mounted to the joint portions of the arm 20B, are connected to a CPU 60Ba through a control communication line. The power is fed through a controller 6B. Note that, the signals to be transmitted through the above-mentioned control cable also include the control signals for the cameras 1103 and 1104. Therefore, this control cable is also connected to the image processing apparatus 60b, and the control apparatus of the arm 20B, the hand 21B, and the tweezer tool 41B are controlled through the same control cable via a multi-host control interface such as a CAN. Further, this embodiment has described the case where the control signals and the image transmission signals are transmitted through the separate signal lines, but the same transmission contact point may be used when a bidirectional high-speed communication interface such as a GIGE and a USB is used.

Figure 13:
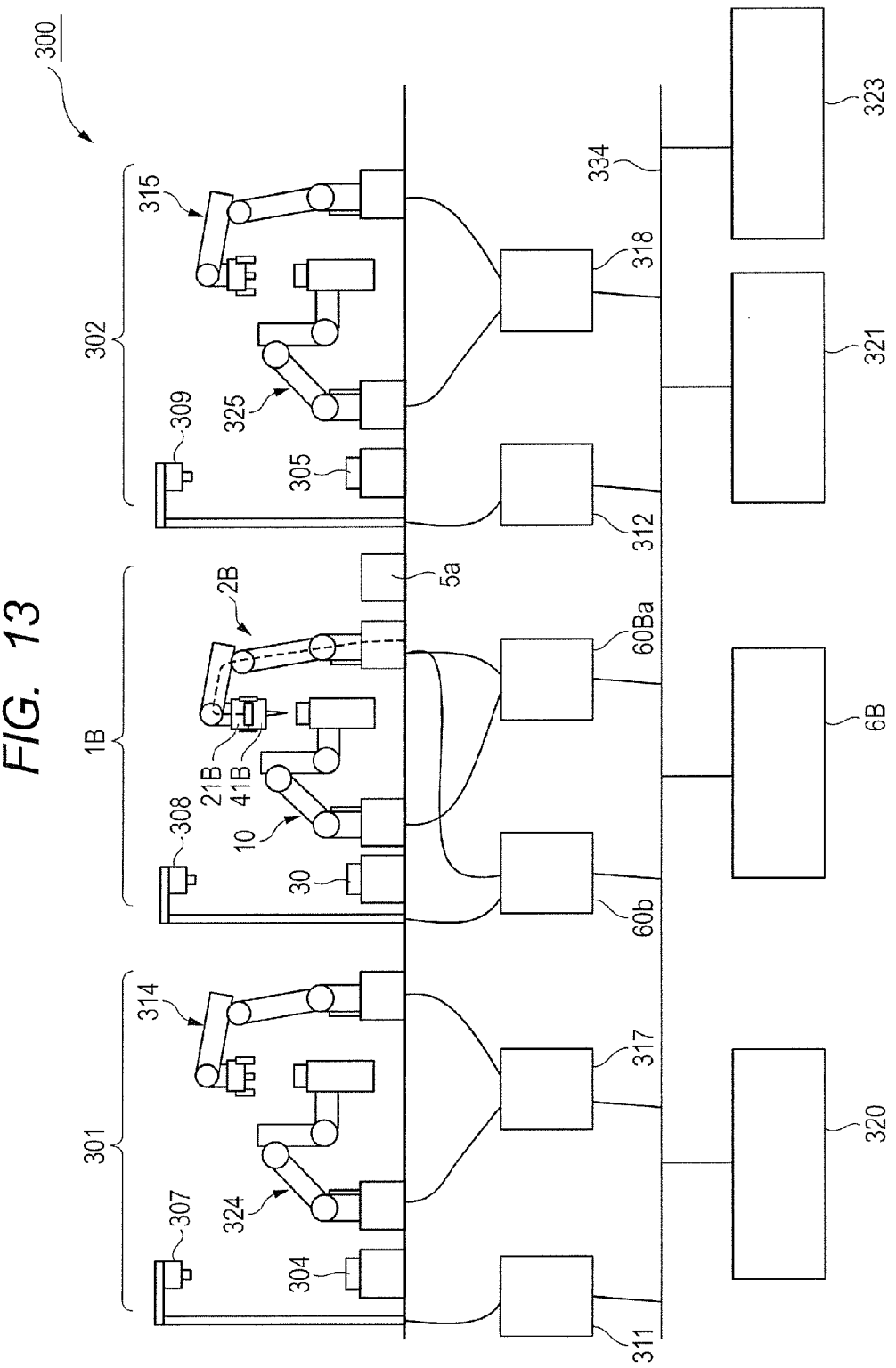
FIG. 13 is a schematic view illustrating a robot system including the robot station according to the third embodiment and multiple other robot stations.

Next, a robot system 300 obtained by combining the robot station 1B according to the third embodiment and existing robot stations 301 and 302 each including a fixed hand is described with reference to FIG. 13. FIG. 13 is a schematic view illustrating the robot system 300 including the robot station 1B according to the third embodiment and the multiple other robot stations 301 and 302.

As illustrated in FIG. 13, the robot system 300 includes the robot station 1B according to the third embodiment, which includes the freely removable tweezer tool 41B, and the multiple robot stations 301 and 302 each including a fixed hand. The multiple robot stations 301 and 302 are robot stations that correspond to various steps, and each have a configuration similar to that of the robot station 1B except that the tweezer tool 41B is not provided.

Above feed trays 30, 304, and 305, global cameras 307, 308, and 309 are mounted, respectively. Images taken by the global cameras 307, 308, and 309 are sent to image processing apparatus 60b, 311, and 312, respectively, and are processed into presence and absence information of the assembly component and posture and position information of the assembly component based on an image processing program. Note that, an image taken by the stereo camera 46 provided in the tweezer tool 41B is also sent to the image processing apparatus 60b through connection via a dedicated interface, and is processed into necessary positional information.

The power feeding and control of first robot devices 10, 324, and 325, and second robot devices 2B, 314, and 315 of the robot stations 1B, 301, and 302 are performed through the power cables and the control cables arranged in the arms, respectively. The first robot devices 10, 324, and 325, and the second robot devices 2B, 314, and 315 perform control of the position of a motor, control of the gripping force, trajectory calculation of the arm and the hand, etc., by CPUs 60Ba, 317, and 318 based on control signals input through the control cables, respectively.

Controllers 6B, 320, and 321 each perform teaching of the robot, robot language processing, and correction of the shift of the robot coordinates from the vision coordinates. Further, the controllers 6B, 320, and 321 perform, for the respective robot stations 1B, 301, and 302, a step teaching operation, a program operation, a correction operation between the robot teaching point and the vision, and error monitoring.

In this embodiment, the image processing apparatus 60b, 311, and 312 and the controllers 6B, 320, and 321 are connected to each other in a parallel manner via a local area network 334. With this configuration, the controllers 6B, 320, and 321 may control adjacent robot stations as well as their corresponding robot stations. That is, the control over the multiple stations, such as control of cooperative operation between the stations, is facilitated.

A system controller 323 is connected to the controllers 6B, 320, and 321 via a local area network 334, and performs control of cooperative operation among the respective robot stations 1B, 301, and 302, control of the entire robot system, error monitoring, and operation management.

As described above, according to this embodiment, the wiring cables extending from the tweezer tool 41B are routed easily, and the teaching of the arm 20B can be performed easily. For example, in the case where the stereo camera is provided to the tweezer tool or the like, how to route the wiring that connects the camera to the tool becomes an issue. In a case where the stereo camera is provided to the arm, the wiring only needs to be routed along the arm, but in the case where the stereo camera is provided to the tool, the tool may be disconnected from the arm, and hence the wiring cannot be routed along the arm. Therefore, it is necessary to provide wiring to the tool independently of the arm. Further, when the tool is used in connection to the arm, the wiring may move in an unintended direction in response to the motion of the arm, and hence, in the teaching for various work steps, the motion of the arm needs to be determined in consideration of the movement of the wiring.

In particular, the hardness of the wiring may change depending on the age of service and the temperature under an operation environment, and further, the wiring needs to be replaced at the time of maintenance. Therefore, the wiring has many fluctuation factors, which become a serious problem in realizing stable operation of the device. In this embodiment, the image communication for the stereo camera, the control communication for the tool, and the power feeding to the tool and the stereo camera are performed through the contact points provided at the connection portion between the tool and the hand, and the contact points are controlled to realize the image communication, the control communication, and the power feeding. That is, the contact point units are provided on the tool side and the arm side, and thus, even in the case where the freely removable tool is used, the route of the wiring can be fixed to the route of the wiring along the arm. Thus, the teaching of the arm can be performed in a manner similar to that of the conventional case, and there is no need to consider the fluctuation in movement of the wiring due to the motion of the arm. As a result, the time period required for change-over of the robot device can be reduced.

Fourth Embodiment

Next, a robot station 1C according to a fourth embodiment of the present invention is described with reference to FIGS. 14 to 16. The fourth embodiment is different from the third embodiment in the manner of electrical connection of the tweezer tool. Therefore, in the fourth embodiment, the difference from the third embodiment, that is, the manner of electrical connection of the tweezer tool is mainly described. The same components as those in the third embodiment are represented by the same reference symbols, and description thereof is therefore omitted herein.

First, the configuration of the robot station 1C is described with reference to FIGS. 14 and 15. FIG. 14 is a schematic view illustrating the robot station 1C according to the fourth embodiment of the present invention. FIG. 15 is a block diagram of transmission contact points of a second robot device 2C according to the fourth embodiment.

Figure 14:
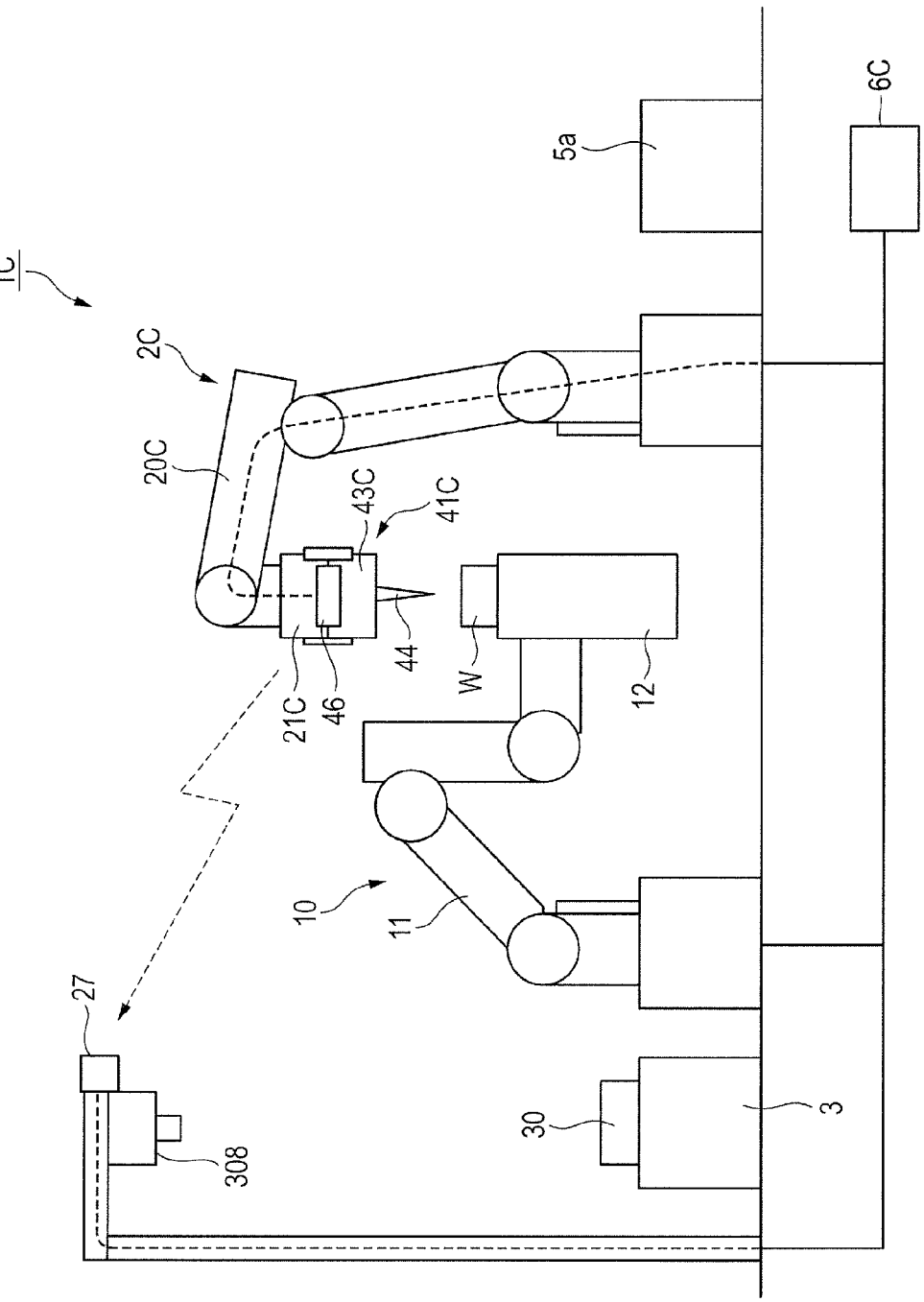
FIG. 14 is a schematic view illustrating a robot station according to a fourth embodiment of the present invention.

As illustrated in FIG. 14, the robot station 1C includes the first robot device 10, the second robot device 2C for assembling a precision component to the workpiece W, the work table 3, a global camera 308, the stand 5a, and a controller 6C.

The second robot device 2C includes a six-axis articulated arm 20C, a tweezer tool 41C connected to a distal end of the arm 20C, and a hand 21C serving as the connector for connecting the tweezer tool 41C to the arm 20C. The arm 20C includes six actuators, and by selectively driving the respective actuators, the tweezer tool 41C and the hand 21C are moved to an arbitrary three-dimensional position. The tweezer tool 41C and the hand 21C moved to the arbitrary position perform, for example, assembly of the precision component at the arbitrary position.

The tweezer tool 41C includes a tweezer tool main body 43C, the tweezers 44, positioning pins 45Ca and 45Cb, and the stereo camera 46. The hand 21C includes the three hand claws 23a, 23b, and 23c and positioning holes 22Ca and 22Cb.

In this embodiment, only the power contact points and the control contact points are used to perform the connection between the tweezer tool 41C and the hand 21C through the transmission contact points. Further, a wireless communication device is built into the stereo camera 46 to perform the communication of the image transmission signals and the control of the camera via the wireless communication device. Thus, the image transmission line is omitted from the dedicated lines that are built into the arm, and only the two cables, that is, the power cable and the control cable are necessary.

Conventionally, high-speed signals, which flow at a speed exceeding 1 Gbps, are transmitted through the dedicated image communication line, and hence the handling of the dedicated image communication line is extremely sensitive. For example, in the case where the contact points are used for the transmission, the contact resistance between the contact points increases due to deterioration in durability of the contact points, and this increase in contact resistance causes rounding of the waveform of the transmission signals. This influence becomes more remarkable as the transmission frequency becomes higher, resulting in communication failure. Further, a shield cable is essential to the image communication line for the purpose of EMC control. However, the shield cable has a drawback to durability against bending and twisting, and in addition, the increase in series resistance due to the deterioration of the transmission contact points imposes significant influence on the transmission characteristics. Therefore, as a tradeoff for the image transmission line provided inside the robot body, there is a disadvantage in that the maintenance cycle becomes shorter.

Note that, as another measure to avoid the use of the contact points, all the communication between the tool and the controller may be performed by wireless. However, a device using a radio wave having a wavelength equal to or shorter than that of at least a millimeter wave or a device using optical communication is essential to the communication interface having a communication speed exceeding 1 Gbps, and the directivity along with the use of the shorter wavelength may cause a trouble in realizing stable operation of the robot system. The wireless communication device in which the directivity causes no trouble has a low transmission speed, and hence the image communication cannot be performed in real time, resulting in a problem in that the tact time of the robot system is increased significantly.

On the other hand, for the stereo camera mounted to the tool, when a specific step is determined, the image taking position and the object to be taken as an image are identified uniquely. An antenna 27 is arranged in accordance with the identification, and thus the stability of the robot system along with the directivity can be secured.

On the other hand, the communication needs to be continued during the operation as well, and the control communication for the hand that cannot be identified in its position and the power feeding that cannot be realized by wireless are performed through the contact point transmission. With this configuration, the image communication to and from the controller, in which the maintenance cycle becomes shorter when the image transmission line is used, can be performed without using the contact points, and only the control communication for the hand and the like, which require the stability, are performed through the contact point transmission, with the result that the maintenance cycle for the wiring and the contact points can be increased significantly. Further, stable operation can be realized.

In the following, specific measures to realize the above-mentioned configuration are described.

Figure 15:
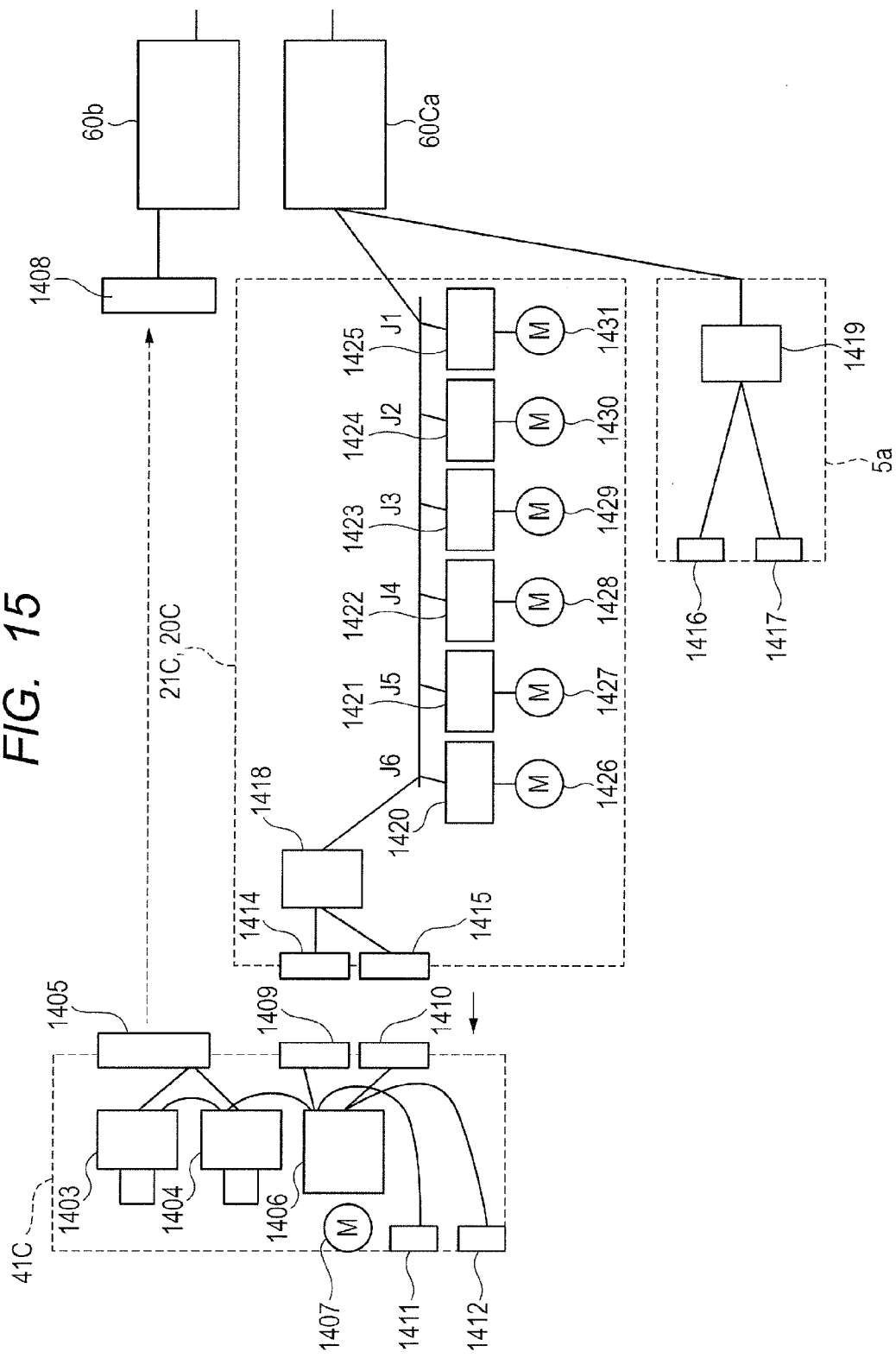
FIG. 15 is a block diagram of transmission contact points of a second robot device according to the fourth embodiment.

As illustrated in FIG. 15, in this embodiment, for cameras 1403 and 1404 mounted to the stereo camera 46, power is only fed from a control apparatus 1406 of the tweezer tool 41C. Note that, the tweezers 44 of the tweezer tool 41C are connected to a motor 1407, and are driven by the motor 1407 to perform opening and closing movement. The image transmission signal line and the control cables of the cameras are connected to a millimeter wave wireless communication unit 1405, and are connected to a wireless communication unit 1408 on the image processing apparatus 60b side through the millimeter wave wireless communication.

The control apparatus 1406 is connected to a signal transmission male contact point 1409 and a power feeding male contact point 1410, and also to a signal transmission male contact point 1411 and a power feeding male contact point 1412, which are additionally provided in a similar manner at a position opposed to the stand 5a for the tweezer tool 41C. The signal transmission male contact point 1411 and the power feeding male contact point 1412 are connected in parallel to the signal transmission male contact point 1409 and the power feeding male contact point 1410. The stand 5a is provided with a control signal transmission female contact point 1416 and a power feeding female contact point 1417, which are similar to a control signal transmission female contact point 1414 and a power feeding female contact point 1415 for the hand claws 23a, 23b, and 23c. Further, the stand 5a is provided with a hand control apparatus 1419 having a function similar to that of a hand control apparatus 1418 that is mounted on the hand 21C side.

Motor control apparatus 1420 to 1425 for respectively controlling motors 1426 to 1431 provided to axes J6 to J1 of the joints of the arm are connected to a CPU 60Ca through the same control line for the hand control apparatus 1418 and 1419. Further, the motor control apparatus 1420 to 1425 are connected to the control apparatus 1406 of the tweezer tool 41C through the contact points 1414, 1415, 1409, and 1410.

In order to determine whether or not the tweezer tool is normally operable, for example, in the third embodiment, it is necessary to drive the arm 20B when the robot station 1B is activated so as to grip the tweezer tool 41B. However, with the system according to this embodiment, the tweezer tool 41C can be controlled from the stand 5a, and hence there is no need to drive the arm 20C. Thus, the maintenance easiness for the tweezer tool 41C can be enhanced.

Further, the camera control system is separated from the tweezer control system, and hence, as long as power is fed, the camera control and the image transmission can be performed irrespective of the robot controller. Therefore, the image processing apparatus 60b alone can confirm the operation of the stereo camera 46 that is mounted to the tweezer tool 41C. Thus, the maintenance easiness can further be enhanced.

Next, a robot system 400 obtained by combining the robot station 1C according to the fourth embodiment and existing robot stations 401 and 402 each including a fixed hand is described with reference to FIG. 16. FIG. 16 is a schematic view illustrating the robot system 400 including the robot station 1C according to the fourth embodiment and the multiple other robot stations 401 and 402.

Figure 16:
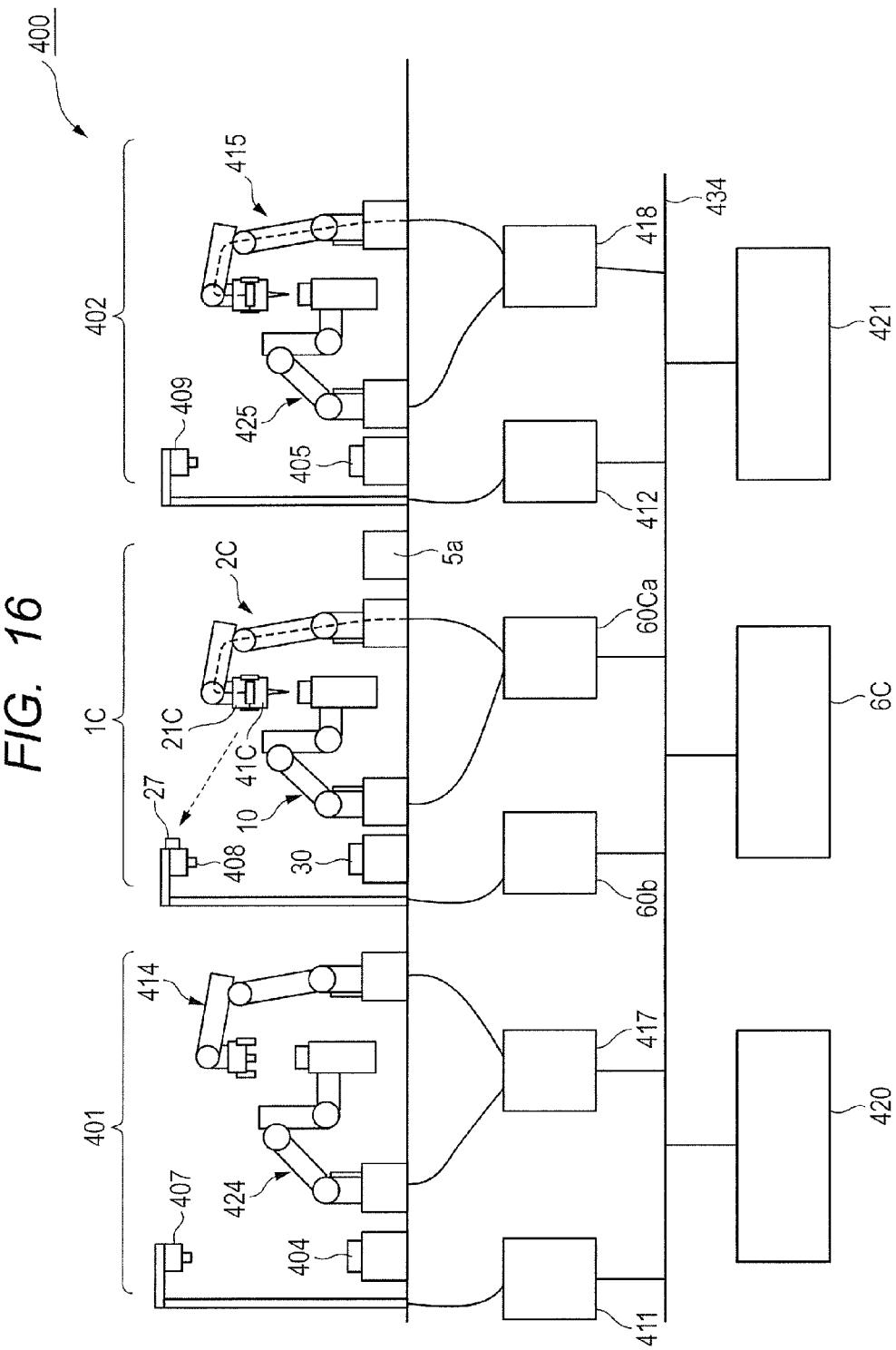
FIG. 16 is a schematic view illustrating a robot system including the robot station according to the fourth embodiment and multiple other robot stations.

As illustrated in FIG. 16, the robot system 400 includes the robot station 1C according to the fourth embodiment, which includes the freely removable tweezer tool 41C, and the multiple robot stations 401 and 402 each including a fixed hand. The multiple robot stations 401 and 402 are robot stations that correspond to various steps, and each have a configuration similar to that of the robot station 1C except that the tweezer tool 41C is not provided.

Above feed trays 30, 404, and 405, global cameras 407, 408, and 409 are mounted, respectively. Images taken by the global cameras 407, 408, and 409 are sent to image processing apparatus 60b, 411, and 412, respectively, and are processed into presence and absence information of the assembly component and posture and position information of the assembly component based on an image processing program. Note that, an image taken by the stereo camera 46 provided in the tweezer tool 41C is also sent to the image processing apparatus 60b through connection via a dedicated interface, and is processed into necessary positional information.

The power feeding and control of first robot devices 10, 424, and 425, and second robot devices 2C, 414, and 415 of the robot stations 1C, 401, and 402 are performed through the power cables and the control cables arranged in the arms, respectively. Then, the first robot devices 10, 424, and 425, and the second robot devices 2C, 414, and 415 perform control of the position of a motor, control of the gripping force, trajectory calculation of the arm and the hand, etc., by CPUs 60Ca, 417, and 418 based on control signals input through the control cables, respectively.

Controllers 6C, 420, and 421 are connected to the image processing apparatus 60b, 411, and 412 and the CPU 60Ca, 417, and 418, and each perform teaching of the robot, robot language processing, and correction of the shift of the robot coordinates from the vision coordinates. Further, the controllers 6C, 420, and 421 perform, for the respective robot stations 1C, 401, and 402, a step teaching operation, a program operation, a correction operation between the robot teaching point and the vision, and error monitoring.

In this embodiment, the image processing apparatus 60b, 411, and 412 and the controllers 6C, 420, and 421 are connected to each other in a parallel manner via a local area network 434. Further, the CPU 60Ca is also connected to the stand 5a through the control cable and the power cable, and the power cable may be activated separately from the robot controller. In the system in which a large number of robot stations are arranged, there is a problem of radio interference in the wireless system. For example, in a wireless HD system that is a representative communication system of millimeter waves, there are only three channels available even when all the permitted frequency bands are used, and only three devices are operable at the same time. However, as in this embodiment, the CPUs 60Ca, 417, and 418 and the image processing apparatus 60b, 411, and 412 are connected to the same local area network in a parallel manner, and thus the timings to use the wireless communication in the respective stations can be confirmed in advance. As a result, the wireless communication can easily be performed in a time division manner. In particular, the above-mentioned configuration is effective in a robot cell that uses a large amount of wireless communication.

The embodiments of the present invention have been described above, but the present invention is not limited to the above-mentioned embodiments. Further, the effects described in the embodiments of the present invention are only examples of the optimum effects that are produced from the present invention, and hence the effects of the present invention are not limited to the effects described in the embodiments of the present invention.

For example, the embodiments of the present invention are described by way of the tweezer tool serving as the end work tool, but the present invention is not limited thereto. As the end work tool, work tools such as a screwdriver, a drill, a soldering machine, and a bonding machine may be mounted instead.

Further, the embodiments of the present invention are described by way of the hand 21A including the three hand claws 23a, 23b, and 23c serving as the multiple hand claws, but the present invention is not limited thereto. It is only necessary that the multiple hand claws be at least two hand claws capable of gripping the workpiece.

According to the present invention, it is possible to provide the small-sized robot device having high versatility without decreasing the work efficiency by removably providing the end effector including a camera at the distal end of the arm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-175889, filed Aug. 8, 2012, which is hereby incorporated by reference herein in its entirety.

What is claimed is:

1. A robot device, comprising:
an end effector tool having:
a main body,
a stereo camera provided in the main body to measure a three-dimensional position, and
guide grooves provided in the main body; and
a robot arm having:
a robot hand at an end of the robot arm, the robot hand having three hand claws that are movable from three different points toward a center position of the three hand claws,
wherein the robot hand is configured to separately grip a workpiece by opening and closing operations of the three hand claws, and the end effector tool by gripping the guide grooves so that the end effector tool is electronically connected to the robot arm,
wherein when the end effector tool is gripped by the three hand claws, the center position of the three hand claws and a center position of the guide grooves are aligned along the same axial line, and the stereo camera is configured to transmit an image taken by the stereo camera through a connection in the robot hand to an image processing apparatus for measuring the three-dimensional position of a workpiece; and wherein the guide grooves of the end effector tool are not part of the three hand claws of the hand.

2. A robot device according to claim 1, further comprising:

a cable hanger for hanging down an image transmission cable from a position above the robot arm, the image transmission cable transmitting a signal of information on the image taken by the stereo camera from the stereo camera to the image processing apparatus.

3. A robot device according to claim 1, wherein the robot hand includes an image signal receiving terminal connected to the image processing apparatus via an image transmission cable arranged along the robot arm, wherein the end effector tool includes an image signal transmitting terminal that is connectable to the image signal receiving terminal and transmits a signal of information on the image taken by the stereo camera, and wherein, when the robot arm and the end effector tool are connected to each other through intermediation of the robot hand, the image signal transmitting terminal is connected to the image signal receiving terminal to transmit the signal of the information on the image taken by the stereo camera from the stereo camera to the image processing apparatus.

4. A robot device according to claim 3, further comprising a control apparatus configured to control the end effector tool, wherein the robot hand includes a control signal transmitting terminal connected to the control apparatus via a control cable arranged along the robot arm, wherein the end effector tool includes a control signal receiving terminal that is connectable to the control signal transmitting terminal, and wherein, when the robot arm and the end effector tool are connected to each other through intermediation of the robot hand, the control signal transmitting terminal is connected to the control signal receiving terminal to control the end effector tool by the control apparatus.

5. A robot device according to claim 3, further comprising a power feeding apparatus configured to feed power for driving the end effector tool, wherein the robot hand includes a power feeding terminal connected to the power feeding apparatus via a power cable arranged along the robot arm, wherein the end effector tool includes a power receiving terminal that is connectable to the power feeding terminal, and wherein, when the robot arm and the end effector tool are connected to each other through intermediation of the robot hand, the power feeding terminal is connected to the power receiving terminal to feed the power to the end effector tool.

6. A robot device according to claim 1, wherein the stereo camera is focused on the grip portion.

* * * * *